United States Patent
Xue et al.

(10) Patent No.: US 11,647,486 B2
(45) Date of Patent: May 9, 2023

(54) INDICATING AVAILABILITY FOR SIDELINK COMMUNICATION

(71) Applicant: QUALCOMM Incorporated, San Diego, CA (US)

(72) Inventors: Yisheng Xue, San Diego, CA (US); Chih-Hao Liu, San Diego, CA (US); Xiaoxia Zhang, San Diego, CA (US); Jing Sun, San Diego, CA (US); Yongbin Wei, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 17/141,699

(22) Filed: Jan. 5, 2021

(65) Prior Publication Data

US 2021/0227527 A1     Jul. 22, 2021

Related U.S. Application Data

(60) Provisional application No. 62/963,667, filed on Jan. 21, 2020.

(51) Int. Cl.
*H04W 72/04* (2009.01)
*H04W 72/044* (2023.01)
*H04L 5/00* (2006.01)
*H04W 72/00* (2023.01)

(52) U.S. Cl.
CPC ......... *H04W 72/044* (2013.01); *H04L 5/0042* (2013.01); *H04W 72/005* (2013.01); *H04W 72/048* (2013.01); *H04W 72/0413* (2013.01)

(58) Field of Classification Search
CPC .. H04L 5/0042; H04L 5/0091; H04W 72/005; H04W 72/0406; H04W 72/0413; H04W 72/044; H04W 72/048; H04W 76/14
See application file for complete search history.

(56) References Cited

U.S. PATENT DOCUMENTS

| | | | |
|---|---|---|---|
| 2016/0165653 A1* | 6/2016 | Liu | H04W 72/12 370/329 |
| 2017/0339533 A1 | 11/2017 | Huang et al. | |
| 2018/0070252 A1 | 3/2018 | Gupta et al. | |
| 2021/0297210 A1* | 9/2021 | Seo | H04L 5/0037 |

OTHER PUBLICATIONS

Partial International Search Report—PCT/US2021/012323—ISA/EPO—dated May 3, 2021.
International Search Report and Written Opinion—PCT/US2021/012323—ISA/EPO—dated Jun. 25, 2021.

* cited by examiner

*Primary Examiner* — Khoa Huynh
(74) *Attorney, Agent, or Firm* — Harrity & Harrity, LLP

(57) ABSTRACT

Various aspects of the present disclosure generally relate to wireless communication. In some aspects, a user equipment (UE) may determine that an availability condition is satisfied, wherein the availability condition relates to an availability of the UE for sidelink communication; identify future available information (FAI) that indicates at least one of a time domain availability of the UE for sidelink communication or a frequency domain availability of the UE for sidelink communication; and transmit the FAI based at least in part on determining that the availability condition is satisfied. Numerous other aspects are provided.

30 Claims, 12 Drawing Sheets

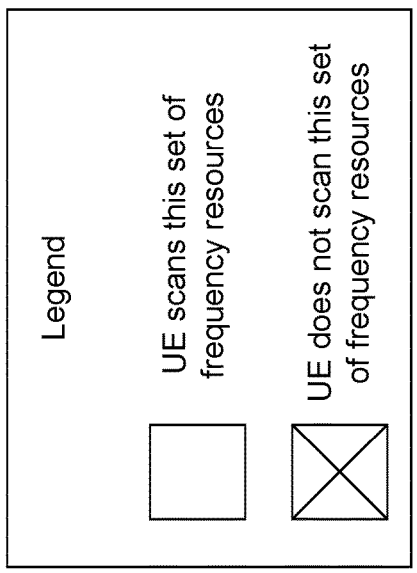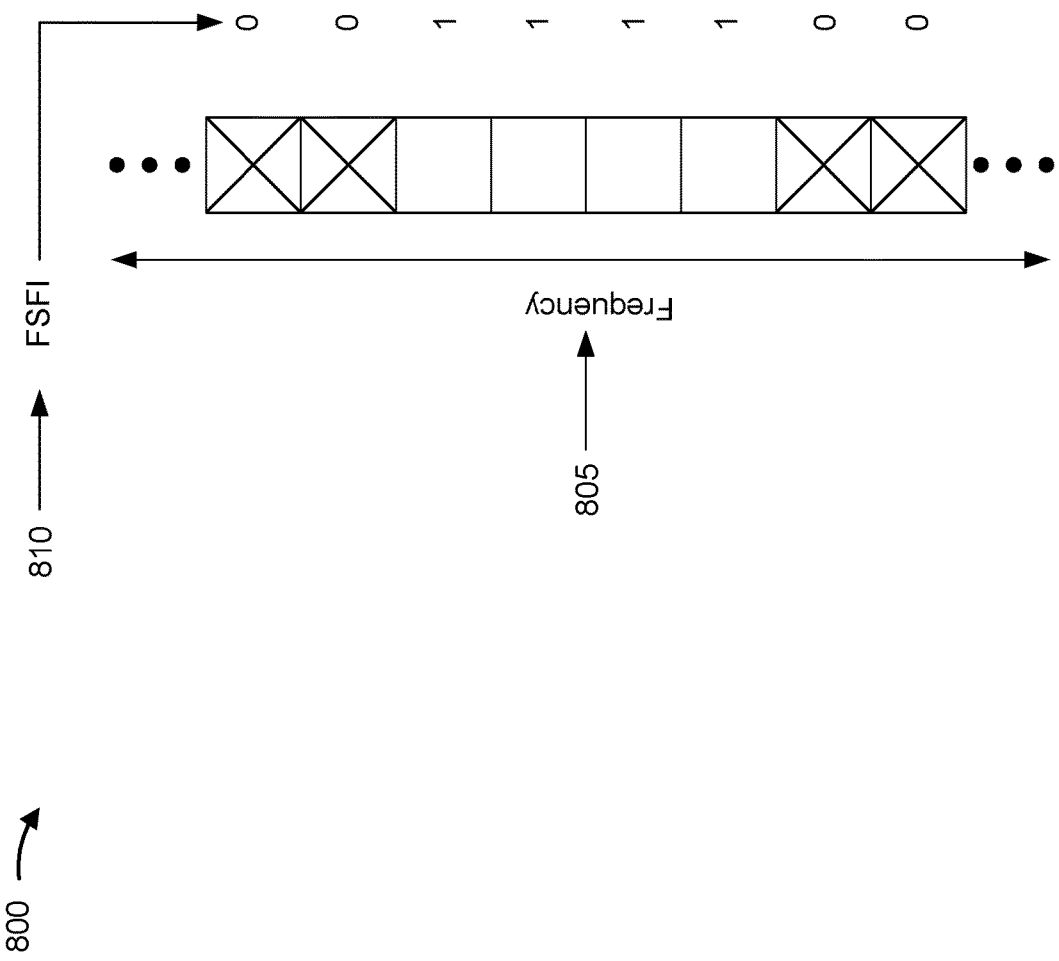
FIG. 8

INDICATING AVAILABILITY FOR SIDELINK COMMUNICATION

CROSS-REFERENCE TO RELATED APPLICATION

This patent application claims priority to U.S. Provisional Patent Application No. 62/963,667, filed on Jan. 21, 2020, entitled "INDICATING AVAILABILITY FOR SIDELINK COMMUNICATION," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for indicating availability for sidelink communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. These improvements may be applicable to other multiple access technologies and the telecommunication standards that employ these technologies.

SUMMARY

In some aspects, a method of wireless communication, performed by a user equipment (UE), may include determining that an availability condition is satisfied, wherein the availability condition relates to an availability of the UE for sidelink communication; identifying future available information (FAI) that indicates at least one of a time domain availability of the UE for sidelink communication or a frequency domain availability of the UE for sidelink communication; and transmitting the FAI based at least in part on determining that the availability condition is satisfied.

In some aspects, a method of wireless communication, performed by a UE, may include receiving a plurality of FAI messages from a plurality of UEs, wherein each FAI message indicates at least one of a time domain availability of a respective UE, of the plurality of UEs, for sidelink communication or a frequency domain availability of the respective UE for sidelink communication; and transmitting, via a sidelink channel, an indication of a set of recommended instances based at least in part on the plurality of FAI messages, wherein the set of recommended instances indicates one or more recommended time periods for sidelink communication, one or more recommended sub-carriers for sidelink communication, or a combination thereof.

In some aspects, a UE for wireless communication may include a memory and one or more processors operatively coupled to the memory. The memory and the one or more processors may be configured to determine that an availability condition is satisfied, wherein the availability condition relates to an availability of the UE for sidelink communication; identify FAI that indicates at least one of a time domain availability of the UE for sidelink communication or a frequency domain availability of the UE for sidelink communication; and transmit the FAI based at least in part on determining that the availability condition is satisfied.

In some aspects, a UE for wireless communication may include a memory and one or more processors operatively coupled to the memory. The memory and the one or more processors may be configured to receive a plurality of FAI messages from a plurality of UEs, wherein each FAI message indicates at least one of a time domain availability of a respective UE, of the plurality of UEs, for sidelink communication or a frequency domain availability of the respective UE for sidelink communication; and transmit, via a sidelink channel, an indication of a set of recommended instances based at least in part on the plurality of FAI messages, wherein the set of recommended instances indicates one or more recommended time periods for sidelink communication, one or more recommended sub-carriers for sidelink communication, or a combination thereof.

In some aspects, a non-transitory computer-readable medium may store one or more instructions for wireless communication. The one or more instructions, when executed by one or more processors of a UE, may cause the one or more processors to determine that an availability condition is satisfied, wherein the availability condition relates to an availability of the UE for sidelink communication; identify FAI that indicates at least one of a time domain availability of the UE for sidelink communication or a frequency domain availability of the UE for sidelink communication; and transmit the FAI based at least in part on determining that the availability condition is satisfied.

In some aspects, a non-transitory computer-readable medium may store one or more instructions for wireless communication. The one or more instructions, when executed by one or more processors of a UE, may cause the one or more processors to receive a plurality of FAI messages from a plurality of UEs, wherein each FAI message indicates at least one of a time domain availability of a respective UE, of the plurality of UEs, for sidelink communication or a frequency domain availability of the respective UE for sidelink communication; and transmit, via a sidelink channel, an indication of a set of recommended instances based at least in part on the plurality of FAI messages, wherein the set of recommended instances indicates one or more recommended time periods for sidelink communication, one or more recommended sub-carriers for sidelink communication, or a combination thereof.

In some aspects, an apparatus for wireless communication may include means for determining that an availability condition is satisfied, wherein the availability condition relates to an availability of the UE for sidelink communication; means for identifying FAI that indicates at least one of a time domain availability of the UE for sidelink communication or a frequency domain availability of the UE for sidelink communication; and means for transmitting the FAI based at least in part on determining that the availability condition is satisfied.

In some aspects, an apparatus for wireless communication may include means for receiving a plurality of FAI messages from a plurality of UEs, wherein each FAI message indicates at least one of a time domain availability of a respective UE, of the plurality of UEs, for sidelink communication or a frequency domain availability of the respective UE for sidelink communication; and means for transmitting, via a sidelink channel, an indication of a set of recommended instances based at least in part on the plurality of FAI messages, wherein the set of recommended instances indicates one or more recommended time periods for sidelink communication, one or more recommended sub-carriers for sidelink communication, or a combination thereof.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 6-10 are diagrams illustrating examples of indicating availability for sidelink communications, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
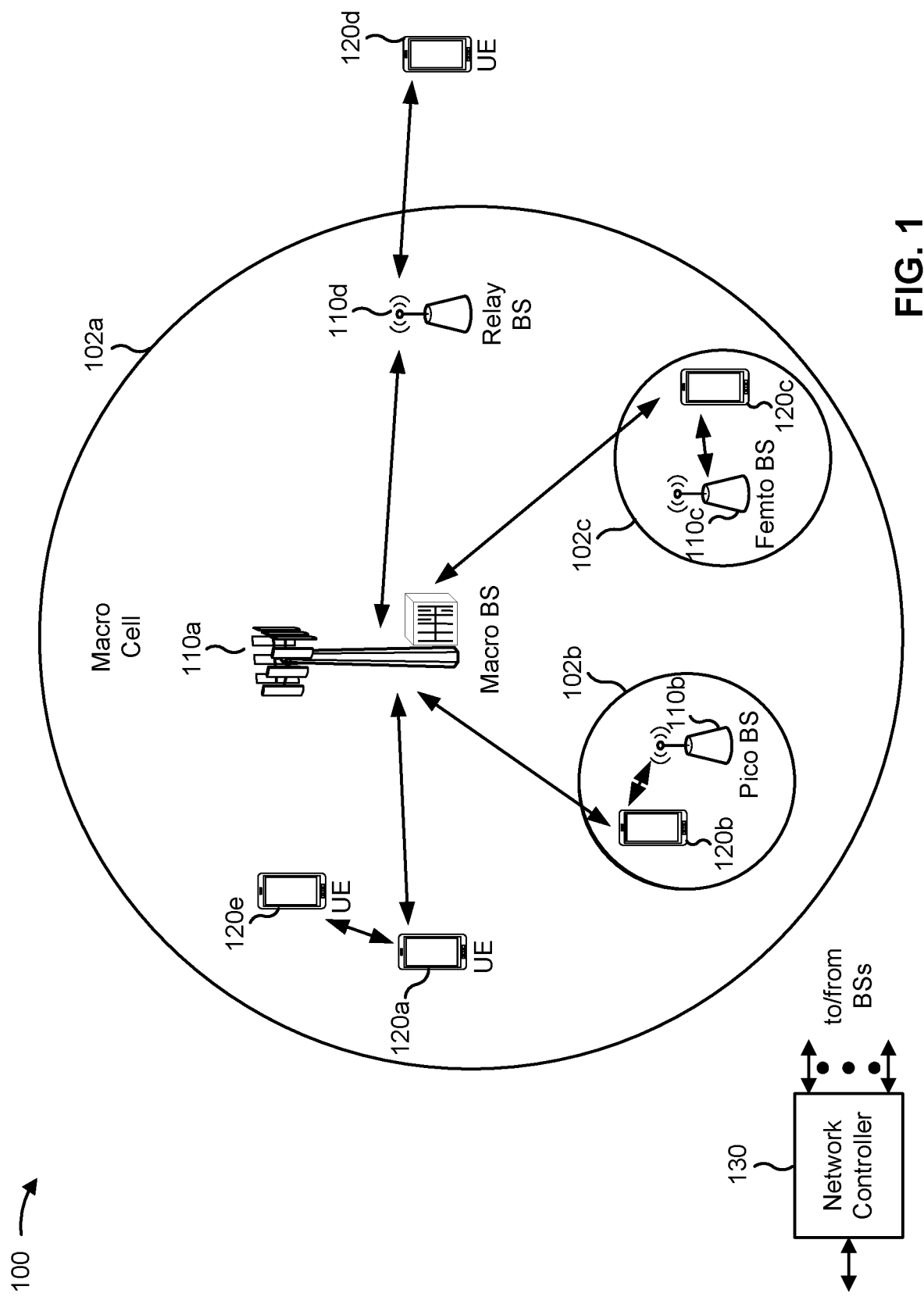
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, a vehicle-to-pedestrian (V2P) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with respect to FIG. 1.

Figure 2:
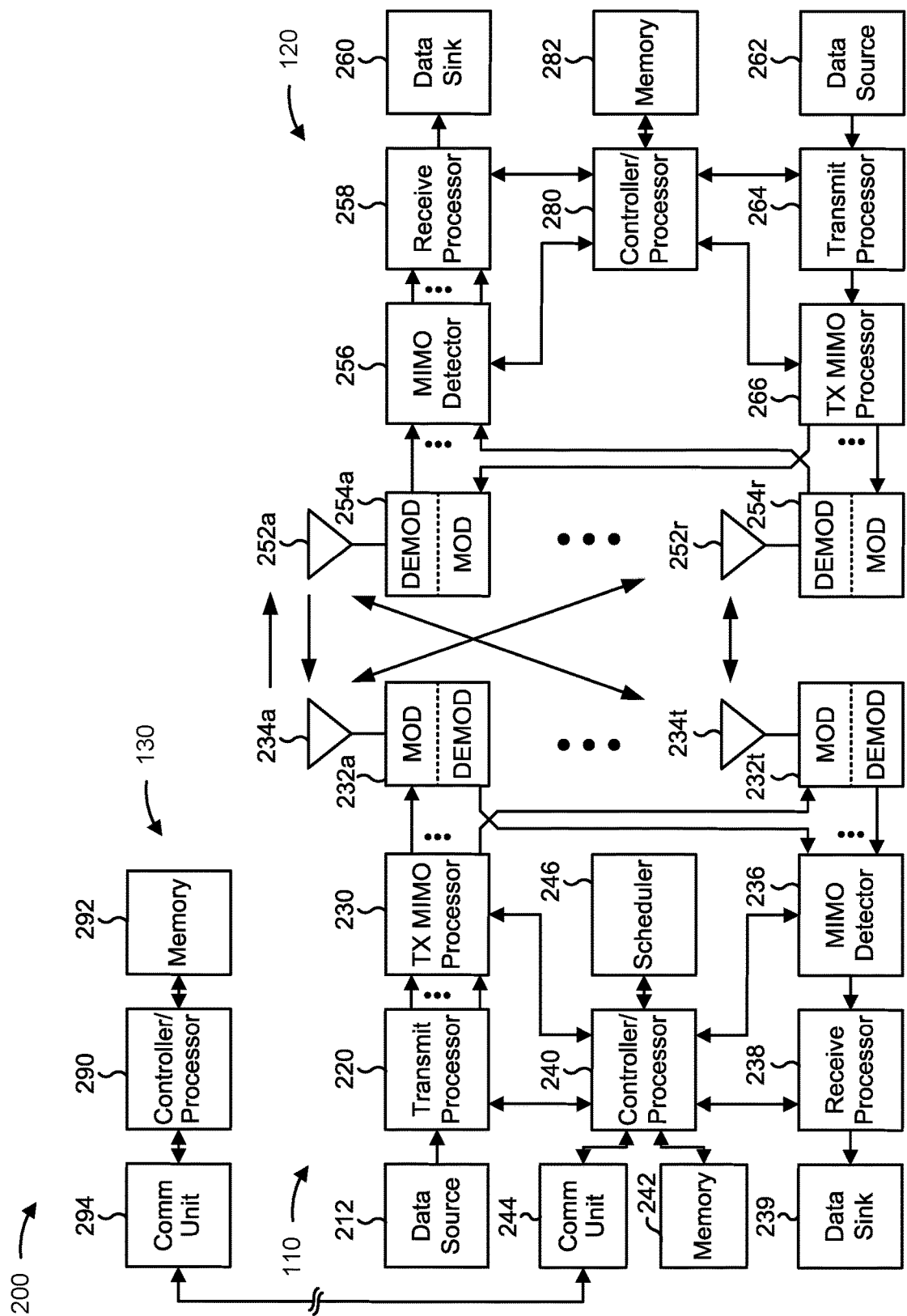
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with indicating availability and/or recommended instances for sidelink communication, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1100 of FIG. 11, process 1200 of FIG. 12, and/or other processes as described herein. A scheduler 246 may schedule UEs for data transmission on the downlink and/or uplink.

In some aspects, UE 120 may include means for determining that an availability condition is satisfied, wherein the availability condition relates to an availability of the UE for sidelink communication; means for identifying future available information (FAI) that indicates at least one of a time domain availability of the UE for sidelink communication or a frequency domain availability of the UE for sidelink communication; means for transmitting the FAI based at least in part on determining that the availability condition is satisfied; and/or the like. In some aspects, UE 120 may include means for receiving a plurality of future available information (FAI) messages from a plurality of UEs, wherein each FAI message indicates at least one of a time domain availability of a respective UE, of the plurality of UEs, for sidelink communication or a frequency domain availability of the respective UE for sidelink communication; means for transmitting, via a sidelink channel, an indication of a set of recommended instances based at least in part on the plurality of FAI messages, wherein the set of recommended instances indicates one or more recommended time periods for sidelink communication, one or more recommended sub-carriers for sidelink communication, or a combination thereof; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with respect to FIG. 2.

Figure 3:
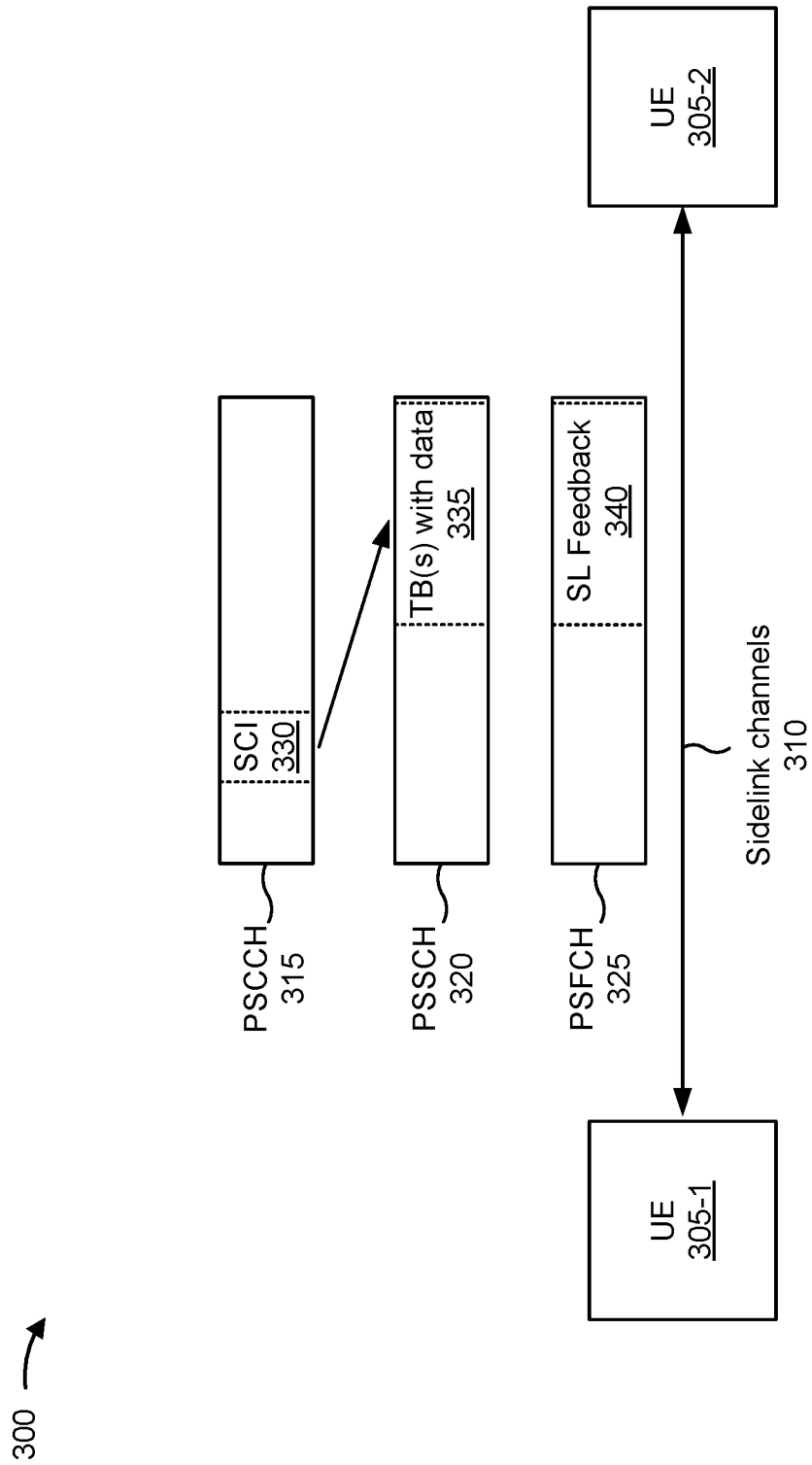
FIG. 3 is a diagram illustrating an example of sidelink communications, in accordance with various aspects of the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, V2P communications, and/or the like), mesh networking, and/or the like. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, symbols, and/or the like) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, spatial resources, and/or the like) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), a scheduling request (SR), and/or the like.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, may measure a reference signal received quality (RSRQ) parameter (e.g., a PSSCH-RSRQ parameter) associated with various sidelink channels, and/or the like, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, channel parameters, and/or the like. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, a modulation and coding scheme (MCS) to be used for the upcoming sidelink transmission, and/or the like. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
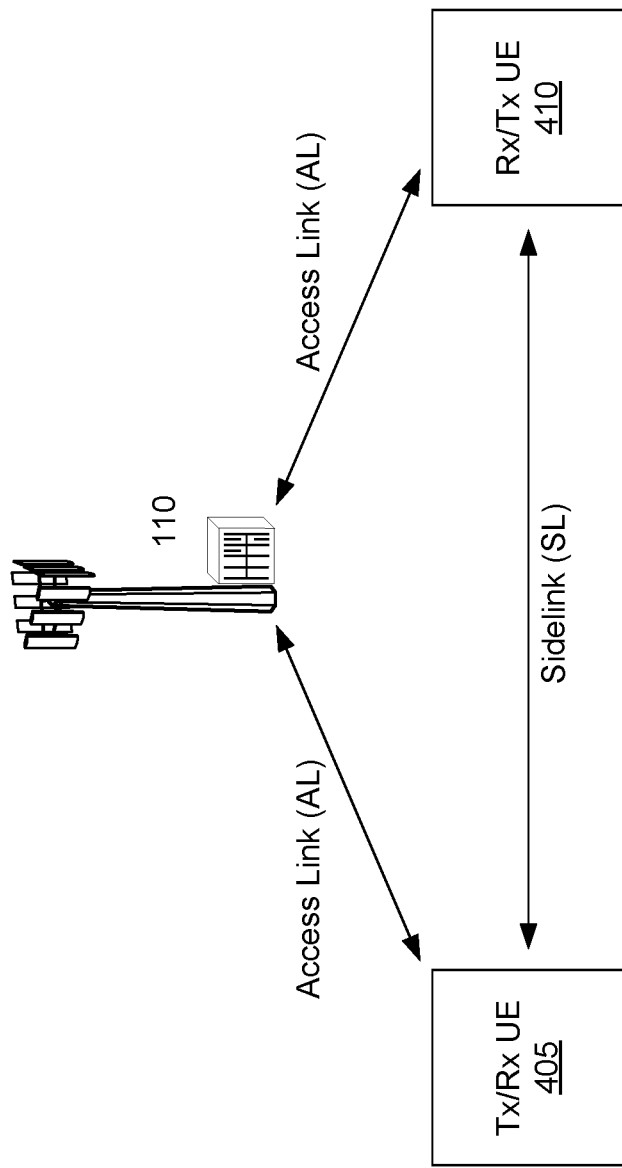
FIG. 4 is a diagram illustrating an example of sidelink communications and access link communications, in accordance with various aspects of the present disclosure.

FIG. 4 is a diagram illustrating an example 400 of sidelink communications and access link communications, in accordance with various aspects of the present disclosure.

As shown in FIG. 4, a transmitter (Tx) UE 405 and a receiver (Rx) UE 410 may communicate with one another via a sidelink, as described above in connection with FIG. 3. As further shown, in some sidelink modes, a base station 110 may communicate with the Tx UE 405 via a first access link. Additionally, or alternatively, in some sidelink modes, the base station 110 may communicate with the Rx UE 410 via a second access link. The Tx UE 405 and/or the Rx UE 410 may correspond to one or more UEs described elsewhere herein, such as the UE 120 of FIG. 1. Thus, a sidelink may refer to a direct link between UEs 120, and an access link may refer to a direct link between a base station 110 and a UE 120. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
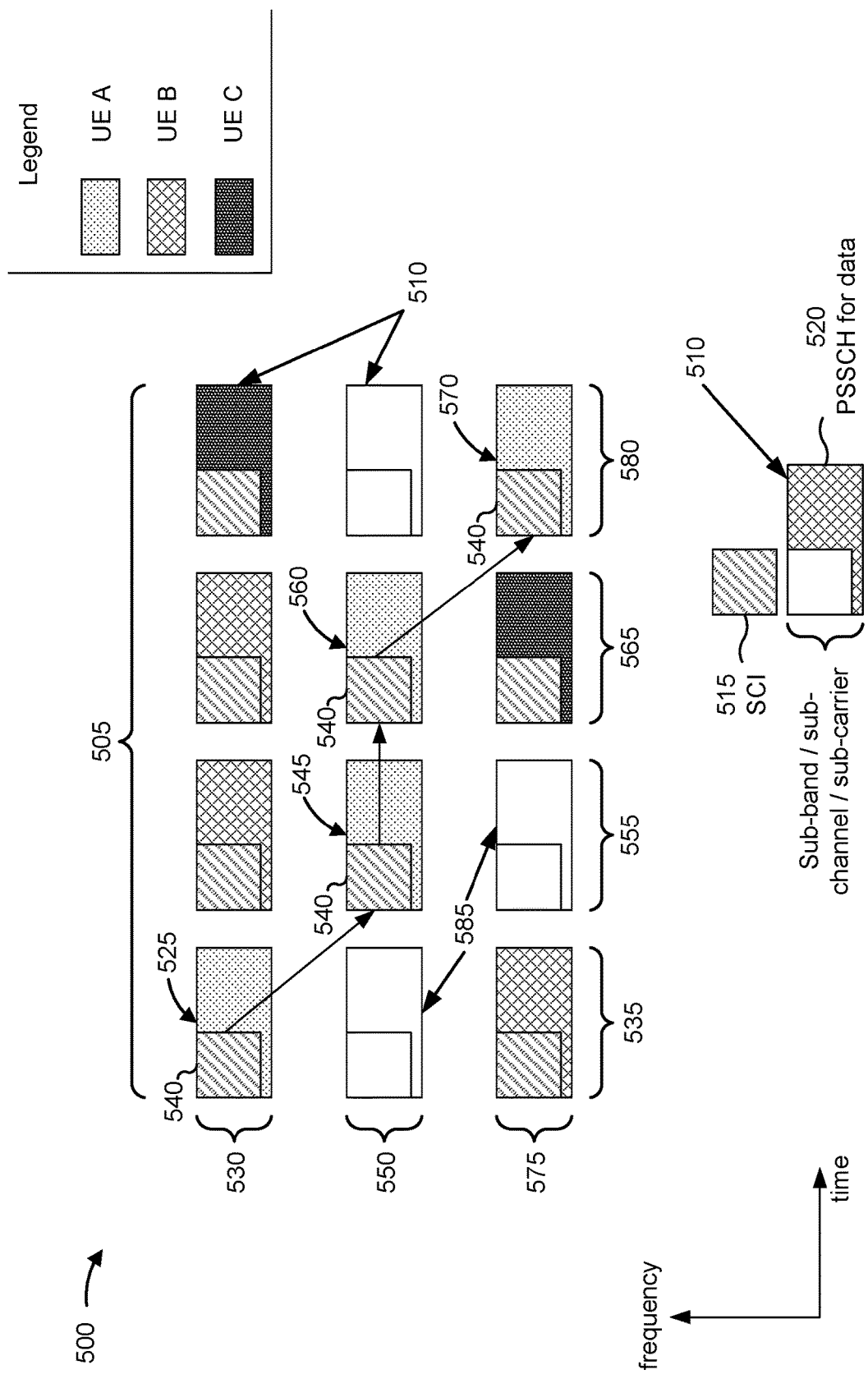
FIG. 5 is a diagram illustrating an example of resource scheduling for sidelink communications, in accordance with various aspects of the present disclosure.

FIG. 5 is a diagram illustrating an example 500 of resource scheduling for sidelink communications, in accordance with various aspects of the present disclosure.

As shown in FIG. 5, a resource pool 505 for sidelink communications may include a number of resource blocks (RBs) 510. Each RB may have a frequency domain component (sometimes referred to as a sub-channel, a sub-band, a sub-carrier, and/or the like) and a time domain component (sometimes referred to as a subframe, a slot, and/or the like). The frequency domain component may be characterized by a specified sub-band (which may include one or more sub-carriers). The time domain component may be a specified time allocation (e.g., a specified number of frames, subframes, slots, symbols, and/or the like). An RB 510 may carry sidelink control information (SCI) 515, which may indicate various control information used for sidelink communications, as described above in connection with FIG. 3. The SCI 515 may be transmitted via a PSCCH of the RB 510. An RB 510 may include a PSSCH 520 for transmitting data.

In some aspects, a UE 305 may perform resource selection and/or scheduling of resources in the resource pool 505 by reserving one or more RBs 510. The UE 305 may be configured to autonomously reserve the one or more RBs 510 by transmitting the RB selection(s) in SCI 515. The RB 510 to be reserved may be selected based at least in part on a specified sensing parameter, sensing procedure, SCI 515 received from another UE 305, and/or the like. Different UEs may reserve different RBs 510. In FIG. 5, the shading of an RB 510 corresponds to the UE (e.g., UE A, UE B, or UE C) that has reserved the RB 510.

As shown in FIG. 5, for example, the UE A may reserve a first RB 525, corresponding to a first sub-band 530 (e.g., in a frequency domain) and a first time period 535. The UE A may transmit SCI 540 in the first RB 525. The SCI 540 may include a scheduling assignment reserving a second RB 545, corresponding to a second sub-band 550 and a second time period 555. As shown, in some aspects, the first and second sub-bands 530 and 550 may be different sub-bands. In some aspects, the first and second sub-bands 530 and 550 may be the same sub-band.

The SCI 540 transmitted in the second RB 545 may include a scheduling assignment reserving a third RB 560, corresponding to the second sub-band 550 and a third time period 565. In some aspects, the third RB 560 may correspond to a sub-band that is different than the second sub-band 550, although they are shown as the same sub-band. The SCI 540 transmitted in the third RB 560 may include a scheduling assignment reserving a fourth RB 570, corresponding to a third sub-band 575 and a fourth time period 580. As shown, in some aspects, the first, second, and third sub-bands 530, 550, and 575 may be different sub-bands. In some aspects, any two or more of the first, second, and third sub-bands 530, 550, and 575 may be the same sub-band.

The RBs 525, 545, 560, and 570 reserved by the UE A for sidelink communication via the SCI 540 may be selected from a set of available RBs 510. An available RB 510 may include an RB 510 having frequency and time resources that are available for sidelink communications. The resource pool 505 also may include unavailable RBs 585. An unavailable RB 585 may be an RB 510 having frequency resources that are unavailable for sidelink communications, time resources that are unavailable for sidelink communications, or a combination thereof.

Sidelink communications have been developed for new radio (NR), in the V2X context, for licensed spectrum with two modes of radio resource allocations (RRAs). In Mode 1, a base station (e.g., BS 110 described in connection with FIG. 1) schedules sidelink resources to be used by UEs 120 for sidelink communications. Mode 2 supports autonomous RRA (RRA by one or more UEs 120 instead of a BS 110) but has been developed based at least in part on assumptions that may not hold true for contexts other than V2X (e.g., more generic sidelink use cases, such as pedestrian UEs in V2X, industrial and/or factory automation, and/or the like). For example, sidelink in the V2X context is developed primarily for broadcasting and multicasting, with less emphasis on unicasting. V2X sidelink is also developed under the assumption that the UE 120 has a dedicated sidelink radio (which UEs 120 that are not configured specifically for V2X may not have), and that this dedicated sidelink radio does not consume power as rapidly as other UE radios. To reduce transmission collisions in V2X sidelink, UEs 120 monitor SCIs from other UEs 120 within a sensing window. V2X sidelink radios are not configured to monitor the availability of other UEs for sidelink communication, but, rather, are configured to use repetitive transmissions to increase the likelihood of receipt.

In use cases other than V2X, UEs may be used for unicast communications and may not include a dedicated sidelink radio. Additionally, or alternatively, in use cases other than V2X, UE radios may be more frequently unavailable for sidelink communications for any number of reasons. For example, a UE radio may be involved in concurrent communications (e.g., other sidelink communications, access link communications, wide band communications, and/or the like); a UE radio may be configured to be periodically deactivated to save power; a UE may have more limited scanning/sensing capability than a typical V2X sidelink radio (e.g., a UE may be limited in the number of SCIs it can decode per subframe); a UE may be forced to deactivate its transmitter to meet a duty-cycle ratio limit (e.g., in some unlicensed bands); and/or the like.

Some techniques and apparatuses described herein enable a UE to transmit an indication of future available information (FAI) that indicates at least one of a time domain availability of the UE for sidelink communication or a frequency domain availability of the UE for sidelink communication, or a combination thereof, thereby providing efficient use of resources in sidelink communications as well as enabling inter-UE communications that might otherwise be difficult or impossible. Some techniques and apparatuses described herein enable a UE to request, from another UE, recommended instances for sidelink communications, and/or enable another UE to indicate recommended instances for sidelink communications (whether or not in response to a request). In this way, aspects of the techniques and apparatuses described herein may enable autonomous NR sidelink communications between UEs in use cases other than (and in addition to) V2X. Aspects of the techniques for providing availability information described herein may reduce the likelihood of collisions between communications, increasing the likelihood of successful communications, which may reduce latency, improve performance, reduce network congestion (e.g., due to retransmissions), and/or the like.

As indicated above, FIG. 5 is provided as an example. Other examples may differ from what is described with respect to FIG. 5.

Figure 6:
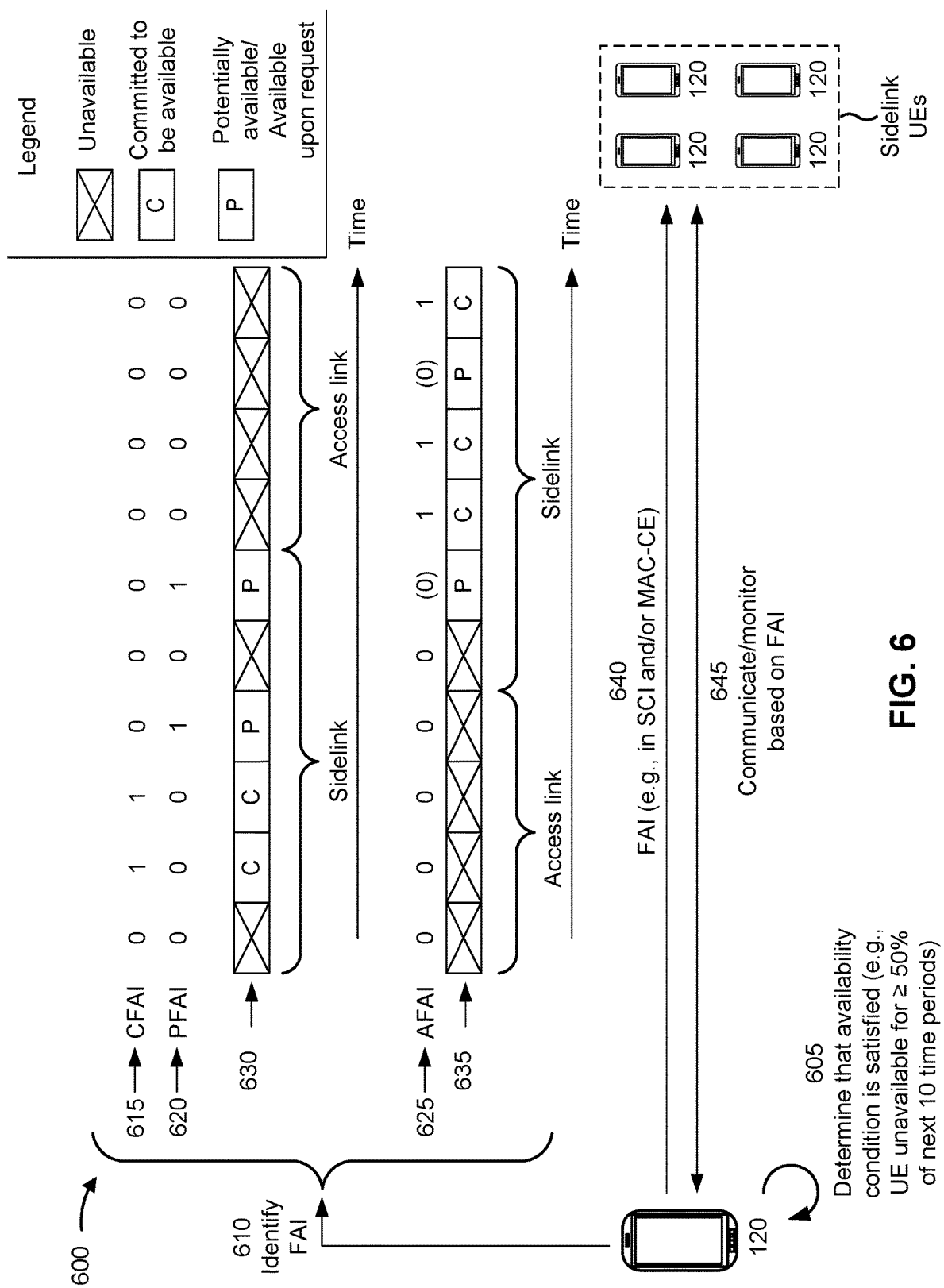

FIG. 6 is a diagram illustrating an example 600 of indicating availability for sidelink communications, in accordance with various aspects of the present disclosure. As shown in FIG. 6, a UE 120 may communicate with one or more other UEs 120 (shown as "sidelink UEs" in FIG. 6) via sidelink communications.

As shown by reference number 605, the UE 120 may determine that an availability condition is satisfied. The availability condition may relate to an availability of the UE 120 for sidelink communication. Determining that the availability condition is satisfied may include determining that the UE 120 will be unavailable for an amount of time that is greater than or equal to a threshold amount of time in an upcoming time period (e.g., one or more slots, subframes, frames, or another time period). The availability of the UE 120 for sidelink communication may include availability of the UE 120 for sidelink reception and/or availability of the UE 120 for sidelink transmission.

In some aspects, the availability condition may be expressed in terms of a threshold percentage of available time and/or frequency. For example, the availability condition may be satisfied if the UE 120 will be unavailable for greater than or equal to A % of time for an upcoming B time periods. The B time periods may include B seconds, B milliseconds, B symbols, B slots, B subframes, B frames, and/or the like. As an example, an availability condition may be satisfied if the UE 120 will be unavailable for sidelink communications for greater than or equal to 50% of an upcoming 10 time periods.

In some aspects, the UE 120 may be configured with the availability condition. In some aspects, the UE 120 may receive an indication of the availability condition from a base station 110, another UE 120, and/or the like. For example, if there is a cluster or group of sidelink UEs 120, then the UE 120 may receive the indication of the availability condition from a cluster head UE 120 or group head UE 120. In some aspects, the indication of the availability condition may include an indication of the availability parameters A and B.

As shown by reference number 610, the UE 120 may identify future available information (FAI). The FAI may indicate at least one of a time domain availability of the UE 120 for sidelink communication or a frequency domain availability of the UE 120 for sidelink communication, or a combination thereof. Time domain availability of the UE 120 may be indicated, by the FAI, in terms of seconds, milliseconds, symbols, slots, subframes, frames, and/or the like. Frequency domain availability of the UE 120 may be indicated, by the FAI, in terms of sub-carriers, carriers, sub-bands (e.g., sub-bandwidths, bandwidth parts, and/or the like), bands (e.g., having a bandwidth), sub-channels, frequency ranges, and/or the like. Combinations of time and frequency domain availability may be indicated, by the FAI, in terms of combinations of any of the above time and frequency units. For example, combinations of time and frequency domain availability may be indicated, by the FAI, in terms of resource elements (REs), resource blocks (RBs), sub-channels, channels, and/or the like.

The FAI may include committed FAI (CFAI) 615, potential FAI (PFAI) 620, alternative FAI (AFAI) 625, or a combination thereof. As shown, the FAI may indicate a resource configuration 630 corresponding to an upcoming set of time periods, where each box in the illustrated resource configuration 630 represents a time period. The resource configuration 630 may include time periods during which the UE 120 will be communicating via an access link, in which case the UE 120 will be unavailable for sidelink communication, as shown. The remaining time periods may include time periods during which the UE 120 will be available for sidelink communication.

The CFAI 615 may indicate one or more time periods during which the UE 120 will be available for sidelink communication, as indicated by the boxes containing a "C," one or more time periods during which the UE 120 will be unavailable for sidelink communication, as indicated by the boxes containing an "X," or a combination thereof. As discussed below in connection with FIG. 7, the CFAI 615 may additionally, or alternatively, indicate one or more sub-carriers on which the UE 120 will be available for sidelink communication, one or more sub-carriers on which the UE 120 will be unavailable for sidelink communication, or a combination thereof.

The PFAI 620 may indicate one or more time periods during which the UE 120 potentially will be available for sidelink communication—for example, one or more time periods during which the UE 120 will be available for sidelink communication if requested to be available during the one or more time periods by another UE 120, as indicated by boxes containing a "P." As discussed below in connection with FIG. 7, the PFAI 620 may additionally, or alternatively, indicate one or more sub-carriers on which the UE 120 will be available for sidelink communication if requested to be available by another UE 120. In some aspects, the PFAI 620 may indicate one or more time periods during which the UE 120 will be available for sidelink communications if the UE 120 receives the request from the other UE 120 within a specified amount of time before the first time period of the one or more time periods begins.

The AFAI 625 may indicate one or more alternative time periods during which the UE 120 will be available for sidelink communication as an alternative to the CFAI 615 and/or one or more alternative time periods during which the UE 120 will be unavailable for sidelink communication as an alternative to the CFAI 615. Additionally, or alternatively, the AFAI 625 may indicate one or more alternative sub-carriers on which the UE 120 will be available for sidelink communication as an alternative to the CFAI 615 and/or one or more alternative sub-carriers on which the UE 120 will be unavailable for sidelink communication as an alternative to the CFAI 615.

In some aspects, the FAI may include a bitmap, where a value of a bit in the bitmap indicates whether the UE 120 is available for sidelink communication during a time period corresponding to the bit. The value of the bit (alone or in combination with one or more values of one or more additional bits) may indicate the type of availability corresponding to a time period such as, for example, committed availability, potential availability, and/or the like. As discussed below in connection with FIG. 7, the bitmap may indicate whether the UE 120 is available and/or unavailable for sidelink communication on one or more sub-carriers. In some aspects, the bitmap may indicate whether the UE 120 is available and/or unavailable for sidelink communication in a combination of a time period and one or more sub-carriers. In some aspects, the FAI may include separate bitmaps for different sub-carriers, sub-channels, and/or the like.

For example, a bitmap may include a bit string (e.g., a set of bits) associated with CFAI 615 and a bit string associated with PFAI 620, where a "0" corresponding to a particular time period in both bit strings indicates that the UE 120 will be unavailable for sidelink communication during the corresponding time period. A "1" in the CFAI 615 bit string may indicate that the UE 120 will be available during the corresponding time period (e.g., regardless of whether another UE 120 requests the UE 120 to be available in the time period). A "1" in the PFAI bit string may indicate that the UE 120 potentially will be available during the corresponding time period (e.g., will be available if requested to be available in the time period by another UE 120). The AFAI 625 may indicate an alternative resource configuration 635, in which, for example, a "0" in the AFAI bit string may indicate unavailability of the UE 120 during the corresponding time period and a "1" in the AFAI bit string may indicate availability (e.g., only potential availability, only committed availability, or either potential availability or committed availability) of the UE 120 during the corresponding time period. In AFAI 625, a "1" may correspond to committed availability (e.g., as described in connection with CFAI 615), potential availability (e.g., as described in connection with PFAI 620), or either. As shown, the UE 120 may use the AFAI 625, for example, to indicate an alternative resource configuration 635 that specifies a different set of time periods during which the UE 120 may communicate via an access link.

As shown by reference number 640, the UE 120 may transmit the FAI to the one or more sidelink UEs 120. In some aspects, the UE 120 may transmit the FAI based at least in part on determining that the availability condition is satisfied. The UE 120 may transmit the FAI via sidelink control information (SCI), in a medium access control (MAC) control element (CE) (MAC-CE) (e.g., a MAC-CE scheduled by the SCI), and/or the like. In some aspects, the UE 120 may transmit an FAI indicator in SCI, where the FAI indicator indicates whether the MAC-CE includes the FAI for the UE 120.

The UE 120 may repeat the transmission of the FAI. In some aspects, the FAI may be transmitted using a single bitmap to indicate availability of the UE 120 for a set of time periods. The same bitmap may be used to indicate availability of the UE 120 for additional sets of time periods by repeating the resource configuration for additional time periods. For example, the bitmap corresponding to the 10 time periods illustrated in FIG. 6 may indicate availability for 50 time periods by repeating the resource configuration, indicated in a single bitmap, 5 times. In aspects, the FAI may be transmitted periodically. The periodicity of the transmission of the FAI may be specified with respect to any number of different parameters. For example, the FAI may be transmitted and/or the resource configuration indicated by the FAI may be interpreted as repeating with a periodicity of C seconds, where C is less than or equal to B and where the modulus of B and C is 0.

Aspects of the FAI indicating techniques described above may be used to broadcast the availability of a UE 120 for sidelink communications, such that other UEs 120 may be able to determine the availability of the UE 120 and configure their sidelink communications with the UE 120 accordingly. This may facilitate a reduction in transmission overhead by reducing or eliminating a need for redundant communications, which may result in power savings, more efficient use of radio resources, and/or enhancement of link reliability. Aspects of the FAI techniques described above may be used to enable negotiation between UEs 120 for scheduling sidelink communications that work for all UEs 120 participating in the sidelink communications. Aspects of the FAI techniques described above also may enable more efficient and reliable communications between a UE and multiple other devices, such as by facilitating negotiation of sidelink communications between the UE and the other devices.

As indicated above, FIG. 6 is provided as an example. Other examples may differ from what is described with respect to FIG. 6.

Figure 7:
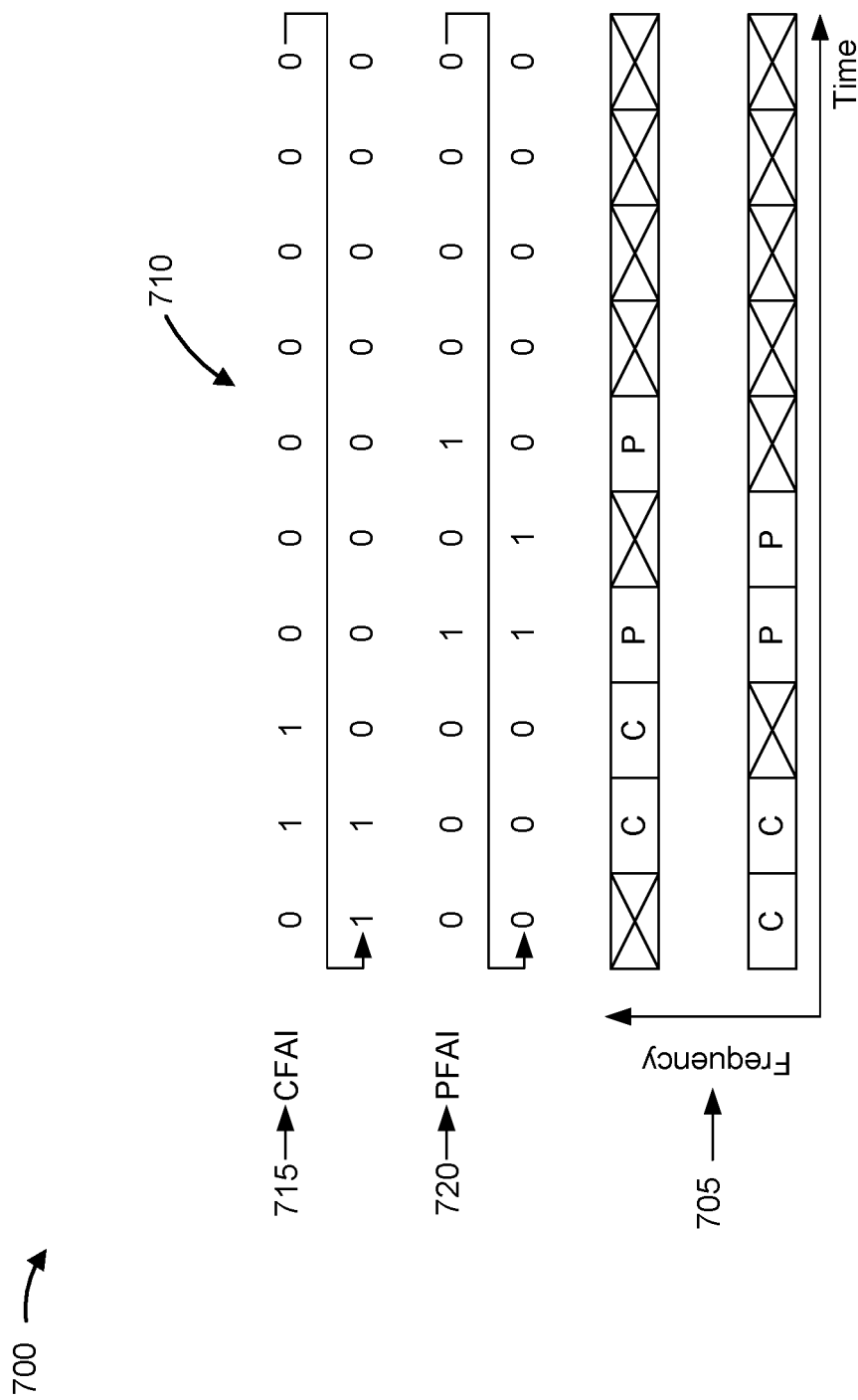

FIG. 7 is a diagram illustrating another example 700 of indicating availability for sidelink communications, in accordance with various aspects of the present disclosure.

As shown by reference number 705, FAI may indicate a combination of time domain availability and frequency domain availability of the UE 120 for sidelink communication. For example, each of the blocks may represent an RB. As shown, the FAI may include a combination of time and frequency availability, and may include a bitmap 710, where a value of a bit in the bitmap 710 indicates whether the UE 120 will be available (or potentially will be available) for sidelink communication during a time period corresponding to the bit and on one or more sub-carriers corresponding to the bit. In some aspects, FAI may indicate availability only in terms of a frequency domain, in which case, each value of a bit in the bitmap may indicate whether the UE 120 will be available (or potentially will be available) for sidelink communication on one or more sub-carriers corresponding to the bit.

As shown in FIG. 7, the bitmap 710 may include a bit string 715 associated with CFAI (a "CFAI bit string" 715) and a bit string 720 associated with PFAI (a "PFAI bit string" 720). A "0" corresponding to a particular time period and frequency combination in both bit strings 715 and 720 indicates that the UE 120 will be unavailable for sidelink communication during the corresponding time period and on the corresponding carrier or carriers. A "1" in the CFAI bit string 715 may indicate that the UE 120 will be available during the corresponding time period and on the corresponding carrier or carriers. A "1" in the PFAI bit string 720 may indicate that the UE 120 potentially will be available during the corresponding time period and on the corresponding carrier or carriers (e.g., will be available if requested to be available by another UE, as described elsewhere herein). In some aspects, a bitmap 710 may include any number of different combinations of CFAI bit strings 715, PFAI bit strings 720, and/or AFAI bit strings.

As indicated above, FIG. 7 is provided as an example. Other examples may differ from what is described with respect to FIG. 7.

FIG. 8 is a diagram illustrating another example 800 of indicating availability for sidelink communications, in accordance with various aspects of the present disclosure.

As shown by reference number 805, FAI may include future scanning frequency information (FSFI) that indicates one or more sets of frequency resources (e.g., sub-carriers) that will be scanned by the UE 120 and/or one or more sets of frequency resources (e.g., sub-carriers) that will not be scanned by the UE 120. In FIG. 8, each block represents a set of frequency resources, such as a set of sub-carriers, a set of sub-bands, a set of sub-channels, and/or the like. As shown, the FAI may be indicated by a bitmap 810 having a bit string associated with FSFI, where a "0" corresponding to a particular set of frequency resources may indicate that the UE 120 does not scan the corresponding set of frequency resources. A "1" corresponding to a particular set of frequency resources may indicate that the UE 120 scans the corresponding set of frequency resources.

In some aspects, the UE 120 may be configured to transmit the FSFI in response to determining that an availability condition is satisfied, where the availability condition includes a bandwidth scanning condition. For example, the UE 120 may determine that the availability condition is satisfied by determining that the UE 120 is capable of scanning an amount of a bandwidth resource pool that is less than or equal to a threshold amount of the bandwidth resource pool. In some aspects, the bandwidth scanning condition may be expressed in terms of a threshold percentage of the bandwidth resource pool. For example, the availability condition may be satisfied if the UE 120 is capable of scanning less than or equal to D % of the bandwidth resource pool. In some aspects, the threshold percentage (or other threshold value), such as the value of D may be configured for the UE 120 by a base station 110 or another UE 120.

As indicated above, FIG. 8 is provided as an example. Other examples may differ from what is described with respect to FIG. 8.

Figure 9:
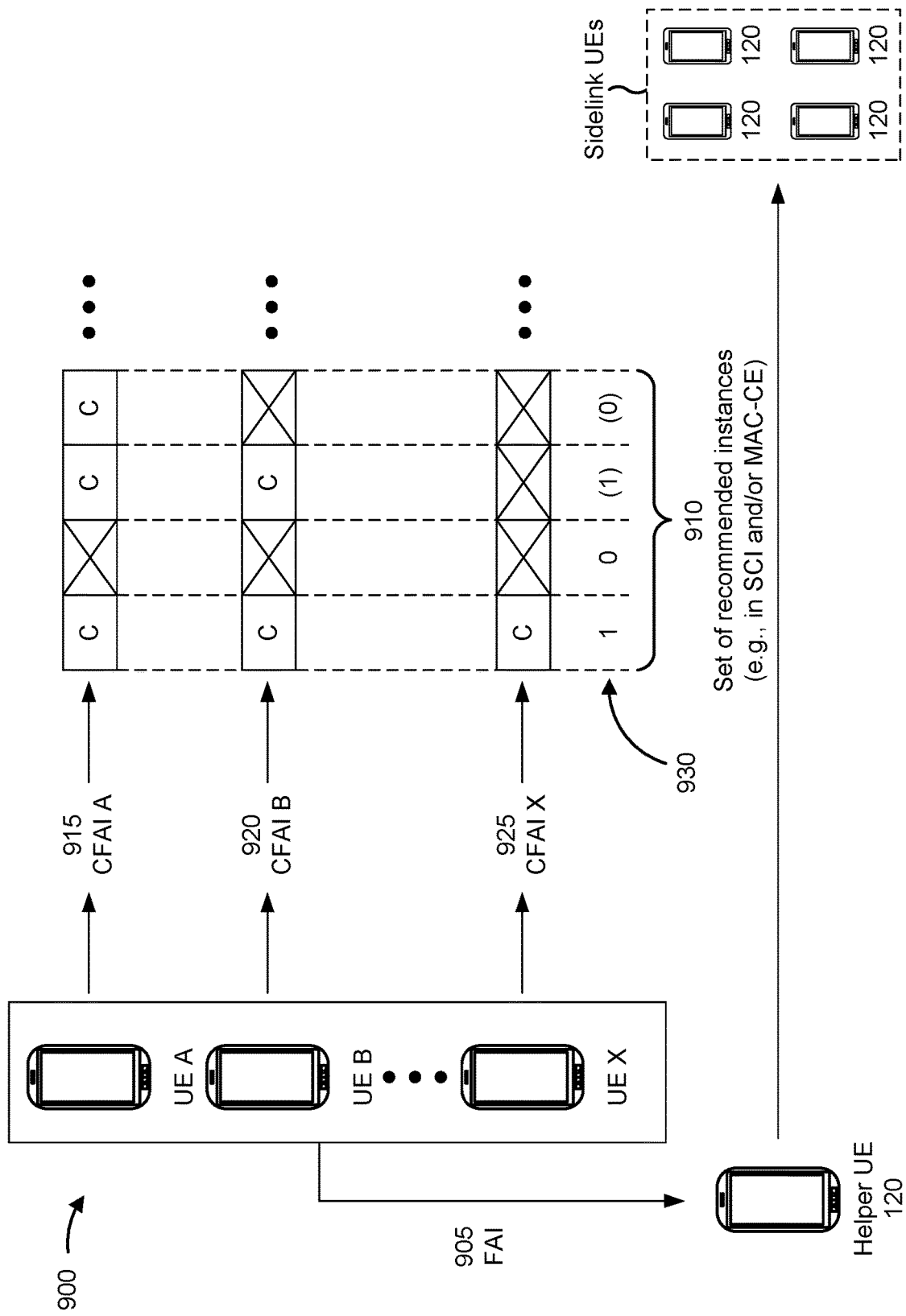

FIG. 9 is a diagram illustrating an example 900 of indicating recommended instances for sidelink communications, in accordance with various aspects of the present disclosure. As shown in FIG. 9, a UE 120 (shown as "helper UE" in FIG. 9) and one or more other UEs 120 (shown as "sidelink UEs" in FIG. 9) may communicate with each other.

As shown by reference number 905, the helper UE 120 may receive a plurality of future available information (FAI) messages from a plurality of UEs (shown as UE A, UE B, . . . , UE X). UE A, UE B, . . . , UE X may be sidelink UEs 120. Each FAI message may indicate a time domain availability of a respective UE A, UE B, . . . , or UE X, for sidelink communication and/or a frequency domain availability of the respective UE A, UE B, . . . , or UE X, for sidelink communication. Each FAI message may include CFAI, PFAI, AFAI, and/or FSFI, as described above. The plurality of FAI messages may be included in at least one of a plurality of sidelink control information messages, a plurality of medium access control (MAC) control elements, or a combination thereof.

As shown by reference number 910, the helper UE 120 may transmit, via a sidelink channel to one or more sidelink UEs 120, an indication of a set of recommended instances for sidelink communication. The set of recommended instances may be based at least in part on the plurality of FAI messages. The set of recommended instances may indicate one or more recommended time periods for sidelink communication and/or one or more recommended sub-carriers for sidelink communication. In some aspects, the set of recommended instances may be transmitted based at least in part on determining that a threshold number of the plurality of UEs (UE A, UE B, . . . , UE X) have overlapping time and/or frequency availability (e.g., associated with each recommended instance of the set of recommended instances).

As shown, the set of recommended instances may be expressed as an aggregated FAI, based on CFAI A associated with UE A (shown by reference number 915), CFAI B associated with UE B (shown by reference number 920), CFAI X associated with UE X (shown by reference number 925), and/or the like. The set of recommended instances may be indicated using a bitmap 930 in the same way that FAI may be indicated, as described above. For example, the recommended instances may indicate time and/or frequency resources in which all of the UEs (UE A, UE B, . . . , UE X) are available (e.g., by using a bit value of "1"). The recommended instances may indicate time and/or frequency resources in which none of the UEs (UE A, UE B, . . . , UE X) are available (e.g., by using a bit value of "0"). The recommended instances may indicate time and/or frequency resources in which a threshold number of UEs (UE A, UE B, . . . , UE X) are available (e.g., illustrated by an optional bit value of "(1)"). The recommended instances may indicate time and/or frequency resources in which a threshold number of UEs (UE A, UE B, . . . , UE X) are unavailable (e.g., illustrated by an optional bit value of "(0)").

In some aspects, the indication of the set of recommended instances may be transmitted in accordance with a recommended instance of the set of recommended instances (e.g., during a recommended time period and/or on a recommended set of frequency resources). The indication of the set of recommended instances may be transmitted in SCI. In some aspects, the indication of the set of recommended instances may be transmitted in a MAC-CE. The helper UE 120 may transmit an FAI indicator in SCI, where the FAI indicator indicates whether the MAC-CE (e.g., scheduled by the SCI) includes an indication of a set of recommended instances. The indication of the set of recommended instances may be transmitted based at least in part on the helper UE 120 being configured to transmit a physical sidelink broadcast channel (PSBCH). The indication of the set of recommended instances or information that identifies a resource for obtaining the indication of the set of recommended instances may be transmitted in the PSBCH. Thus, the helper UE 120 may be designated and/or configured to monitor SCI and transmit the set of recommendation instances based at least in part on the helper UE 120 also being configured to transmit the PSBCH.

As explained further below in connection with FIG. 10, the indication of the set of recommended instances may be transmitted to another UE 120 based at least in part on receiving a request from the other UE 120 for the set of recommended instances. In some aspects, a set of recommended instances transmitted to a UE 120 in response to receiving a request from the UE 120 may include recommended instances that are specific to the requesting UE 120. For example, a recommended instance may include one or more recommended time periods for the requesting UE 120 to communicate using sidelink communication and/or one or more recommended sub-carriers for the requesting UE 120 to communicate using sidelink communication. A recommended instance transmitted in response to receiving a request from a requesting UE 120 may be based at least in part on FAI associated with the requesting UE 120, FAI associated with another UE 120 identified in the request, FAI associated with other sidelink UEs 120, and/or the like.

As indicated above, FIG. 9 is provided as an example. Other examples may differ from what is described with respect to FIG. 9.

Figure 10:
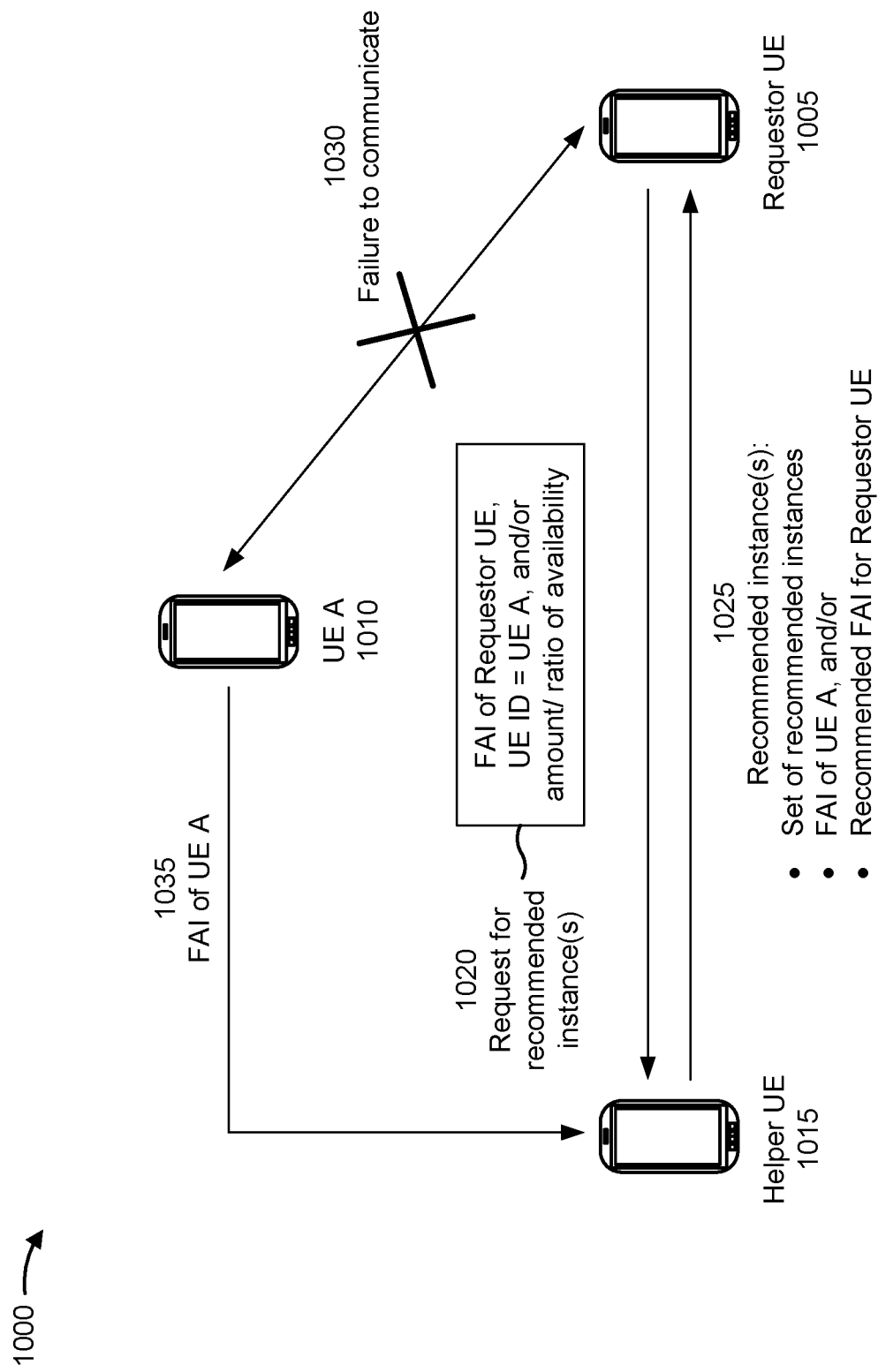

FIG. 10 is a diagram illustrating another example 1000 of indicating recommended instances for sidelink communications, in accordance with various aspects of the present disclosure. As shown in FIG. 10, a requestor UE 1005, a UE A 1010, and a helper UE 1015 may communicate with one another via sidelink communication. The UE 1005, UE A 1010, and/or the helper UE 1015 may be, or be similar to, the UE 120 described in connection with FIG. 1.

As shown by reference number 1020, the requestor UE 1005 may transmit a request for one or more recommended instances for sidelink communication. The requestor UE 1005 may transmit the request to a specific helper UE 1015 and/or the requestor UE 1005 may broadcast the request. As shown by reference number 1025, the helper UE 1015 may transmit an indication of a set of recommended instances. The set of recommended instances may indicate one or more recommended time periods for sidelink communication and/or one or more recommended sub-carriers for sidelink communication. The helper UE 1015 may transmit the set of recommended instances to the requestor UE 1005 and/or may broadcast the set of recommended instances. The request and/or the indication of the set of recommended instances may be transmitted via a sidelink channel.

In some aspects, the requestor UE 1005 may transmit the request for one or more recommended instances based at least in part on a determination that information identifying one or more recommended instances has not been received for a threshold amount of time. For example, the helper UE 1015 may have previously transmitted an indication of a set of recommended instances, and the requestor UE 1005 may have received that indication (or may have missed that indication). Upon determining that the requestor UE 1005 has not received any subsequent indications (e.g., after receipt of a prior indication) of recommended instances for greater than or equal to a threshold amount of time, the requestor UE 1005 may transmit the request.

In some aspects, the requestor UE 1005 may transmit the request via SCI and/or a MAC-CE. For example, the requestor UE 1005 may be configured to use one or more bits in SCI to transmit the request. The requestor UE 1005 may transmit FAI (e.g., CFAI) associated with the requestor UE 1005 in the request. When a MAC-CE is used to transmit FAI associated with the UE 1005, the UE 1005 may transmit the request in the MAC-CE, and the request may include the FAI associated with the requestor UE 1005.

The helper UE 1015 may transmit the indication of the set of recommended instances based at least in part on receiving the request. The helper UE 1015 may transmit the indication of the set of recommended instances via a sidelink communication in accordance with a recommended instance of the set of recommended instances (e.g., in a recommended time period and/or on a recommended set of frequency resources). In some aspects, the helper UE 1015 may transmit the indication of the set of recommended instances via a sidelink communication in accordance with CFAI associated with the requestor UE 1005. As explained above, the helper UE 1015 may receive a plurality of future available information (FAI) messages from a plurality of UEs (e.g., requestor UE 1005, UE A 1010, etc.), and may determine the set of recommended instances based at least in part on the plurality of FAI messages.

In some aspects, the requestor UE 1005 may transmit the request to facilitate communication with one or more specific UEs (e.g., UE A 1010). For example, as shown by reference number 1030, the requestor UE 1005 may determine a failure to communicate with the UE A 1010. The requestor UE 1005 may determine a failure to communicate when the requestor UE 1005 fails to establish a data path with the UE A 1010, when the requestor UE 1005 fails to receive a response from the UE A 1010, and/or the like. For example, the requestor UE 1005 may determine a failure to communicate with the UE A 1010 in response to determining that the requestor UE 1005 has failed to establish a data path with the UE A 1010 within a threshold amount of time after an initial transmission to the UE A 1010.

The request may include an identifier ("UE ID") that identifies the UE A 1010. The requestor UE 1005 may use one or more bits in SCI to transmit the request, and the one or more bits may indicate the UE ID. In some aspects, the requestor UE 1005 may transmit FAI (e.g., CFAI) associated with the requestor UE 1005 in the request. In some aspects, the requestor UE 1005 may include the UE ID in a MAC-CE, and may set a bit in SCI to indicate whether the MAC-CE includes the UE ID and/or other information related to the request.

As shown by reference number 1035, the helper UE 1015 may receive FAI associated with the UE A 1010. The set of recommended instances may be based at least in part on the FAI associated with the UE A 1010. In some aspects, the request may include one or more additional identifiers that identify one or more additional specific UEs for which the set of recommended instances is requested. The indication of the set of recommended instances may include, or may be based at least in part on, one or more FAI messages received from the one or more specific UEs.

In some aspects, the request for the set of recommended instances may include a request for a recommended FAI for the requestor UE 1005. The request may include at least one of an amount of time that the requestor UE 1005 is available for an upcoming time period or one or more identifiers corresponding to one or more UEs with which the other UE is to communicate, or a combination thereof. The set of recommended instances may be determined based at least in part on the amount of time, the one or more identifiers, or a combination thereof.

Aspects of the FAI techniques described above may be used to enable negotiation between UEs for scheduling sidelink communications that work for all UEs participating. Aspects of the FAI techniques described above also may enable more efficient and reliable communications between a UE and one or more other specific UEs, such as by facilitating negotiation of sidelink communications between the UE and the other devices. Aspects of the techniques described above also may enable a UE to preserve power and utilize radio resources more efficiently by enabling the UE to request help, from a helper UE, with establishing sidelink communication with one or more other UEs, thereby reducing or eliminating the need for redundant transmissions in an attempt to establish the communications.

As indicated above, FIG. 10 is provided as an example. Other examples may differ from what is described with respect to FIG. 10.

Aspects of the FAI indication techniques described above in connection with FIGS. 6-10 may facilitate enabling autonomous sidelink communications between UEs in V2X as well as in more general use case contexts. Aspects of the techniques described above may also facilitate reducing transmission collisions in sidelink communications and reducing power consumption by UEs due to a reduction in transmission overhead due to retransmissions.

Figure 11:
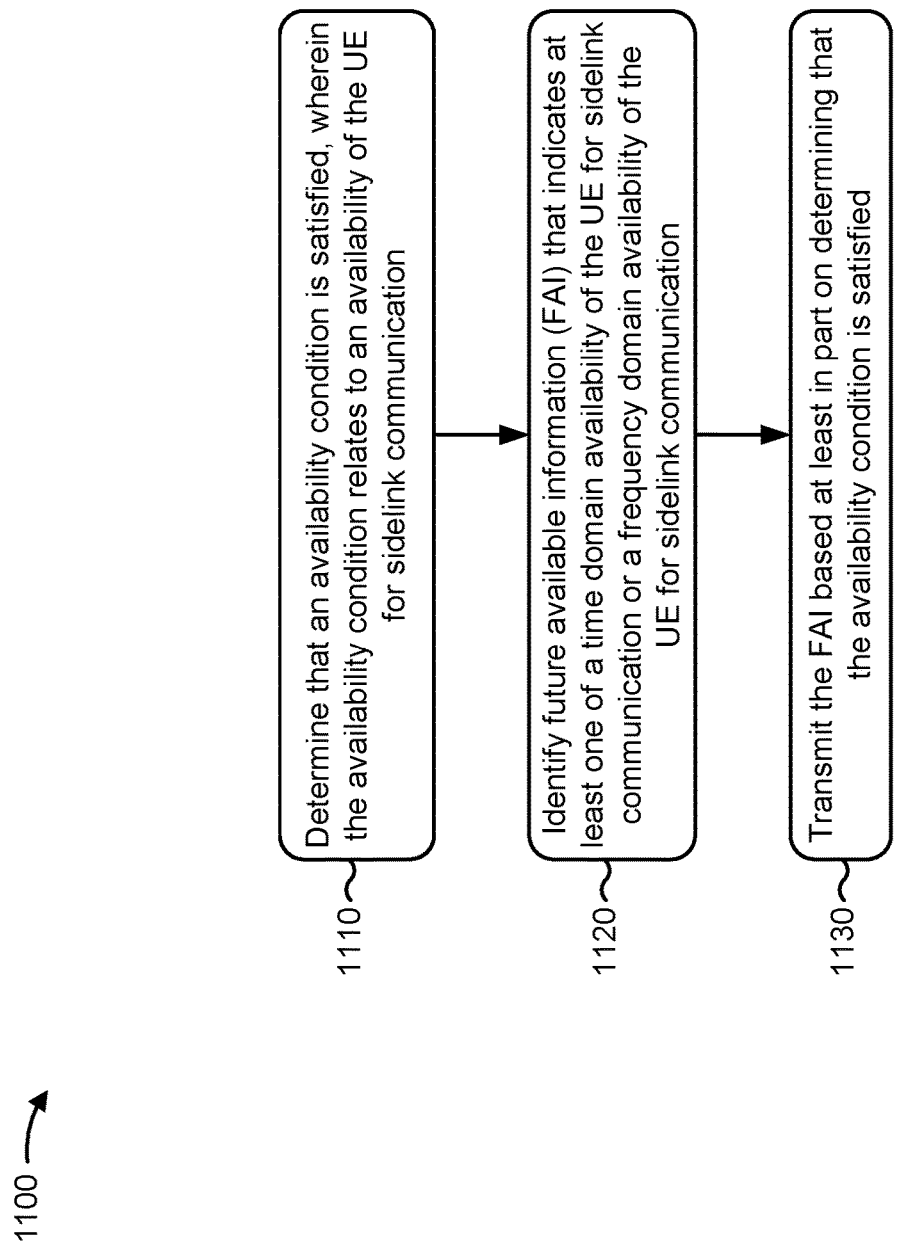
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where the UE (e.g., UE 120 and/or the like) performs operations associated with indicating availability for sidelink communications.

As shown in FIG. 11, in some aspects, process 1100 may include determining that an availability condition is satisfied, wherein the availability condition relates to an availability of the UE for sidelink communication (block 1110). For example, the UE 120 (e.g., using receive processor 258, transmit processor 264, controller/processor 280, memory 282, and/or the like) may determine that an availability condition is satisfied, as described above. In some aspects, the availability condition relates to an availability of the UE for sidelink communication.

As further shown in FIG. 11, in some aspects, process 1100 may include identifying FAI that indicates at least one of a time domain availability of the UE for sidelink communication or a frequency domain availability of the UE for sidelink communication (block 1120). For example, the UE (e.g., using receive processor 258, transmit processor 264, controller/processor 280, memory 282, and/or the like) may identify FAI that indicates at least one of a time domain availability of the UE for sidelink communication or a frequency domain availability of the UE for sidelink communication, as described above.

As further shown in FIG. 11, in some aspects, process 1100 may include transmitting the FAI based at least in part on determining that the availability condition is satisfied (block 1130). For example, the UE (e.g., using transmit processor 264, controller/processor 280, memory 282, and/or the like) may transmit the FAI based at least in part on determining that the availability condition is satisfied, as described above.

Process 1100 may include additional aspects, such as any single aspect or any combination of aspects described below and/or in connection with one or more other processes described elsewhere herein.

In a first aspect, the FAI comprises CFAI that indicates at least one of: one or more time periods during which the UE will be available for sidelink communication, one or more time periods during which the UE will be unavailable for sidelink communication, one or more sub-carriers on which the UE will be available for sidelink communication, one or more sub-carriers on which the UE will be unavailable for sidelink communication, or a combination thereof.

In a second aspect, alone or in combination with the first aspect, the FAI further comprises AFAI that indicates at least one of: one or more alternative time periods during which the UE will be available for sidelink communication as an alternative to the CFAI, one or more alternative time periods during which the UE will be unavailable for sidelink communication as an alternative to the CFAI, one or more alternative sub-carriers on which the UE will be available for sidelink communication as an alternative to the CFAI, one or more alternative sub-carriers on which the UE will be unavailable for sidelink communication as an alternative to the CFAI, or a combination thereof.

In a third aspect, alone or in combination with one or more of the first and second aspects, determining that the availability condition is satisfied comprises determining that the UE will be unavailable for an amount of time that is greater than or equal to a threshold amount of time in an upcoming time period.

In a fourth aspect, alone or in combination with one or more of the first through third aspects, the FAI comprises a bitmap, wherein a value of a bit in the bitmap indicates whether the UE is available for sidelink communication during a time period corresponding to the bit, whether the UE is available for sidelink communication on one or more sub-carriers corresponding to the bit, or whether the UE is available for sidelink communication in a combination of a time period and one or more sub-carriers corresponding to the bit.

In a fifth aspect, alone or in combination with one or more of the first through fourth aspects, the availability of the UE for sidelink communication comprises at least one of: availability of the UE for sidelink reception, availability of the UE for sidelink transmission, or a combination thereof.

In a sixth aspect, alone or in combination with one or more of the first through fifth aspects, process 1100 includes receiving an indication of the availability condition.

In a seventh aspect, alone or in combination with one or more of the first through sixth aspects, transmitting the FAI comprises transmitting the FAI via SCI.

In an eighth aspect, alone or in combination with one or more of the first through seventh aspects, transmitting the FAI comprises transmitting the FAI in a MAC-CE.

In a ninth aspect, alone or in combination with one or more of the first through eighth aspects, process 1100 includes transmitting an FAI indicator in the SCI, wherein the FAI indicator indicates whether the MAC-CE includes the FAI for the UE.

In a tenth aspect, alone or in combination with one or more of the first through ninth aspects, the FAI comprises PFAI that indicates at least one of: one or more time periods during which the UE will be available for sidelink communication if requested to be available by another UE, one or more sub-carriers on which the UE will be available for sidelink communication if requested to be available by another UE, or a combination thereof.

In an eleventh aspect, alone or in combination with one or more of the first through tenth aspects, the FAI includes at least one of committed FAI, potential FAI, alternative FAI, or a combination thereof.

In a twelfth aspect, alone or in combination with one or more of the first through eleventh aspects, the FAI is transmitted periodically.

In a thirteenth aspect, alone or in combination with one or more of the first through twelfth aspects, the availability condition comprises a bandwidth scanning condition, and the FAI comprises FSFI that indicates one or more sub-carriers that will be scanned by the UE.

In a fourteenth aspect, alone or in combination with one or more of the first through thirteenth aspects, determining that the availability condition is satisfied comprises determining that the UE is capable of scanning an amount of a bandwidth resource pool that is less than or equal to a threshold amount of the bandwidth resource pool.

In a fifteenth aspect, alone or in combination with one or more of the first through fourteenth aspects, process 1100 includes transmitting a request for a recommended instance for sidelink communication, the recommended instance comprising at least one of one or more recommended time periods for the UE to communicate using sidelink communication, one or more recommended sub-carriers for the UE to communicate using sidelink communication, or a combination thereof.

In a sixteenth aspect, alone or in combination with one or more of the first through fifteenth aspects, the request for the recommended instance is transmitted based at least in part on a determination that information identifying one or more recommended instances has not been received for a threshold amount of time.

In a seventeenth aspect, alone or in combination with one or more of the first through sixteenth aspects, transmitting the request for the recommended instance comprises transmitting the request via at least one of SCI, a MAC-CE, or a combination thereof.

In an eighteenth aspect, alone or in combination with one or more of the first through seventeenth aspects, process 1100 includes receiving an indication of the recommended instance from another UE.

In a nineteenth aspect, alone or in combination with one or more of the first through eighteenth aspects, the indication of the recommended instance is received in at least one of a time period or a sub-carrier in which the UE is available according to the FAI.

In a twentieth aspect, alone or in combination with one or more of the first through nineteenth aspects, the request for the recommended instance comprises a request for a recommended instance for sidelink communication with one or more specific UEs, and the request includes one or more identifiers corresponding to the one or more specific UEs.

In a twenty first aspect, alone or in combination with one or more of the first through twentieth aspects, the recommended instance includes one or more FAIs corresponding to the one or more specific UEs.

In a twenty second aspect, alone or in combination with one or more of the first through twenty first aspects, the recommended instance includes a recommended FAI for the UE based at least in part on the FAI transmitted by the UE.

In a twenty third aspect, alone or in combination with one or more of the first through twenty second aspects, the request for the recommended instance includes a request for a recommended FAI for the UE, the request includes at least one of an amount of time that the UE is available for an upcoming time period, one or more identifiers corresponding to one or more UEs with which the UE is to communicate, or a combination thereof.

In a twenty fourth aspect, alone or in combination with one or more of the first through twenty third aspects, process 1100 includes communicating based at least in part on the recommended instance.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
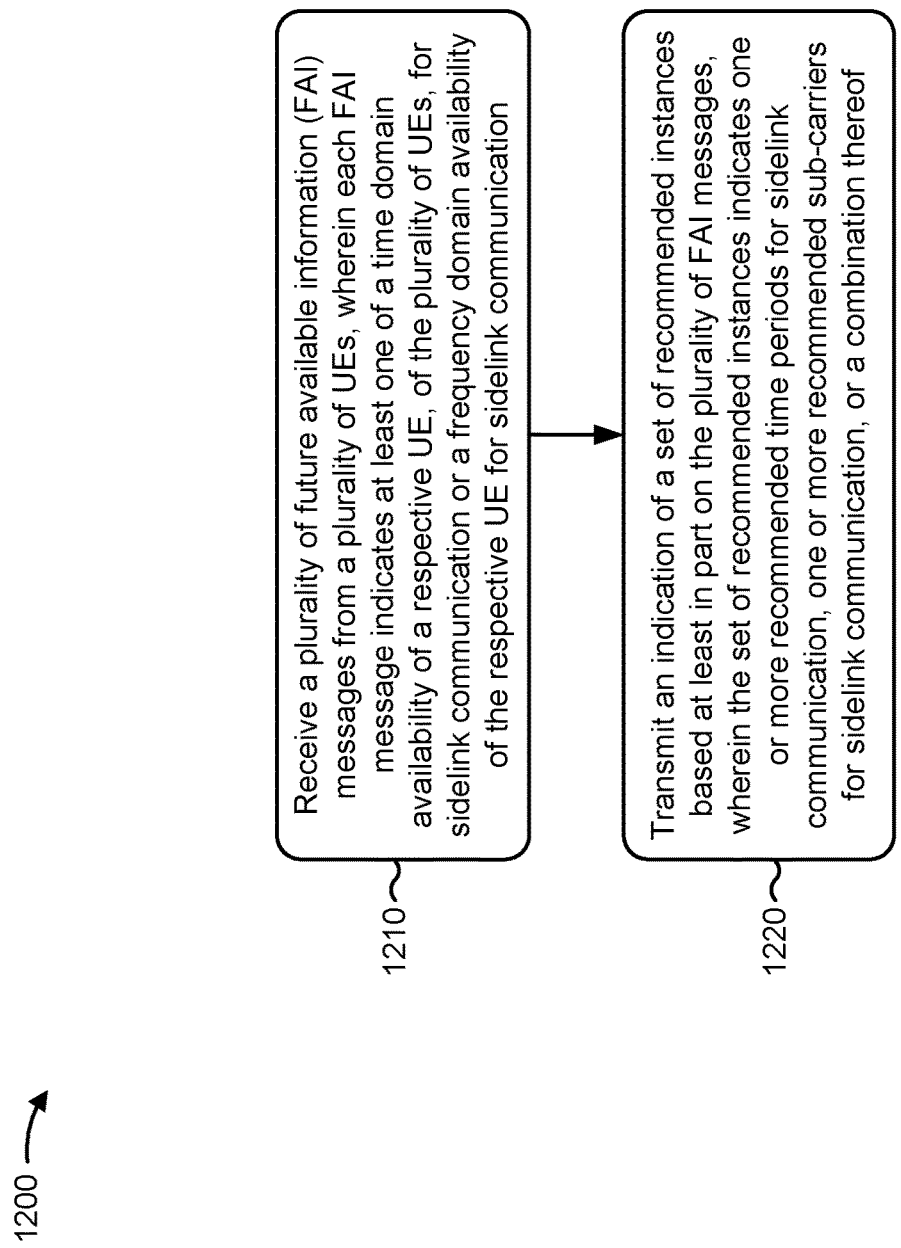
FIG. 12 is a diagram illustrating another example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120 and/or the like) performs operations associated with indicating availability for sidelink communications.

As shown in FIG. 12, in some aspects, process 1200 may include receiving a plurality of FAI messages from a plurality of UEs, wherein each FAI message indicates at least one of a time domain availability of a respective UE, of the plurality of UEs, for sidelink communication or a frequency domain availability of the respective UE for sidelink communication (block 1210). For example, the UE (e.g., using receive processor 258, controller/processor 280, memory 282, and/or the like) may receive a plurality of FAI messages from a plurality of UEs, as described above. In some aspects, each FAI message indicates at least one of a time domain availability of a respective UE, of the plurality of UEs, for sidelink communication or a frequency domain availability of the respective UE for sidelink communication.

As further shown in FIG. 12, in some aspects, process 1200 may include transmitting, via a sidelink channel, an indication of a set of recommended instances based at least in part on the plurality of FAI messages, wherein the set of recommended instances indicates one or more recommended time periods for sidelink communication, one or more recommended sub-carriers for sidelink communication, or a combination thereof (block 1220). For example, the UE (e.g., using transmit processor 264, controller/processor 280, memory 282, and/or the like) may transmit, via a sidelink channel, an indication of a set of recommended instances based at least in part on the plurality of FAI messages, as described above. In some aspects, the set of recommended instances indicates one or more recommended time periods for sidelink communication, one or more recommended sub-carriers for sidelink communication, or a combination thereof.

Process 1200 may include additional aspects, such as any single aspect or any combination of aspects described below and/or in connection with one or more other processes described elsewhere herein.

In a first aspect, the plurality of FAI messages are included in at least one of a plurality of sidelink control information messages, a plurality of MAC-CEs, or a combination thereof.

In a second aspect, alone or in combination with the first aspect, the indication of the set of recommended instances is transmitted in a recommended instance of the set of recommended instances.

In a third aspect, alone or in combination with one or more of the first and second aspects, the indication of the set of recommended instances is transmitted in sidelink control information.

In a fourth aspect, alone or in combination with one or more of the first through third aspects, the indication of the set of recommended instances is transmitted in a MAC-CE.

In a fifth aspect, alone or in combination with one or more of the first through fourth aspects, process 1200 includes transmitting an FAI indicator in sidelink control information, wherein the FAI indicator indicates whether the MAC-CE includes the indication of the set of recommended instances.

In a sixth aspect, alone or in combination with one or more of the first through fifth aspects, the indication of the set of recommended instances is transmitted based at least in part on the UE being configured to transmit a PSBCH.

In a seventh aspect, alone or in combination with one or more of the first through sixth aspects, the indication of the set of recommended instances or information that identifies a resource for obtaining the indication of the set of recommended instances is transmitted in the PSBCH.

In an eighth aspect, alone or in combination with one or more of the first through seventh aspects, the indication of the set of recommended instances is transmitted to another UE based at least in part on receiving a request from the other UE for the set of recommended instances.

In a ninth aspect, alone or in combination with one or more of the first through eighth aspects, the request includes FAI for the other UE, and the indication of the set of recommended instances is transmitted to the other UE in at least one of an available time period or an available sub-carrier indicated in the FAI for the other UE.

In a tenth aspect, alone or in combination with one or more of the first through ninth aspects, the request includes one or more identifiers that identify one or more specific UEs for which the set of recommended instances is requested.

In an eleventh aspect, alone or in combination with one or more of the first through tenth aspects, the indication of the set of recommended instances includes or is based at least in part on one or more FAI messages received from the one or more specific UEs.

In a twelfth aspect, alone or in combination with one or more of the first through eleventh aspects, the indication of the set of recommended instances includes a recommended FAI for the other UE based at least in part on an FAI received from the other UE.

In a thirteenth aspect, alone or in combination with one or more of the first through twelfth aspects, the request for the set of recommended instances includes a request for a recommended FAI for the other UE and at least one of an amount of time that the other UE is available for an upcoming time period or one or more identifiers corresponding to one or more UEs with which the other UE is to communicate, and the set of recommended instances is determined based at least in part on the amount of time, the one or more identifiers, or a combination thereof.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

The following provides an overview of some aspects of the present disclosure:

Aspect 1: A method of wireless communication performed by a user equipment (UE), comprising: determining that an availability condition is satisfied, wherein the availability condition relates to an availability of the UE for sidelink communication; identifying future available information (FAI) that indicates at least one of a time domain availability of the UE for sidelink communication or a frequency domain availability of the UE for sidelink communication; and transmitting the FAI based at least in part on determining that the availability condition is satisfied.

Aspect 2: The method of aspect 1, wherein the FAI comprises committed FAI (CFAI) that indicates at least one of: one or more time periods during which the UE will be available for sidelink communication, one or more time periods during which the UE will be unavailable for sidelink communication, one or more sub-carriers on which the UE will be available for sidelink communication, one or more sub-carriers on which the UE will be unavailable for sidelink communication, or a combination thereof.

Aspect 3: The method of aspect 2, wherein the FAI further comprises alternative FAI (AFAI) that indicates at least one of: one or more alternative time periods during which the UE will be available for sidelink communication as an alternative to the CFAI, one or more alternative time periods during which the UE will be unavailable for sidelink communication as an alternative to the CFAI, one or more alternative sub-carriers on which the UE will be available for sidelink communication as an alternative to the CFAI, one or more alternative sub-carriers on which the UE will be unavailable for sidelink communication as an alternative to the CFAI, or a combination thereof.

Aspect 4: The method of any of the preceding aspects, wherein determining that the availability condition is satisfied comprises determining that the UE will be unavailable for an amount of time that is greater than or equal to a threshold amount of time in an upcoming time period.

Aspect 5: The method of any of the preceding aspects, wherein the FAI comprises a bitmap, wherein a value of a bit in the bitmap indicates whether the UE is available for sidelink communication during a time period corresponding to the bit, whether the UE is available for sidelink communication on one or more sub-carriers corresponding to the bit, or whether the UE is available for sidelink communication in a combination of a time period and one or more sub-carriers corresponding to the bit.

Aspect 6: The method of any of the preceding aspects, wherein the availability of the UE for sidelink communication comprises at least one of: availability of the UE for sidelink reception, availability of the UE for sidelink transmission, or a combination thereof.

Aspect 7: The method of any of the preceding aspects, further comprising receiving an indication of the availability condition.

Aspect 8: The method of any of the preceding aspects, wherein transmitting the FAI comprises transmitting the FAI via sidelink control information (SCI).

Aspect 9: The method of any of the preceding aspects, wherein transmitting the FAI comprises transmitting the FAI in a medium access control (MAC) control element (CE) (MAC-CE).

Aspect 10: The method of aspect 9, further comprising transmitting an FAI indicator in sidelink control information (SCI), wherein the FAI indicator indicates whether the MAC-CE includes the FAI for the UE.

Aspect 11: The method of any of the preceding aspects, wherein the FAI comprises potential FAI (PFAI) that indicates at least one of: one or more time periods during which the UE will be available for sidelink communication if requested to be available by another UE, one or more sub-carriers on which the UE will be available for sidelink communication if requested to be available by another UE, or a combination thereof.

Aspect 12: The method of any of the preceding aspects, wherein the FAI includes at least one of committed FAI, potential FAI, alternative FAI, or a combination thereof.

Aspect 13: The method of any of the preceding aspects, wherein the FAI is transmitted periodically.

Aspect 14: The method of any of the preceding aspects, wherein the availability condition comprises a bandwidth scanning condition, and wherein the FAI comprises future scanning frequency information (FSFI) that indicates one or more sub-carriers that will be scanned by the UE.

Aspect 15: The method of aspect 14, wherein determining that the availability condition is satisfied comprises determining that the UE is capable of scanning an amount of a bandwidth resource pool that is less than or equal to a threshold amount of the bandwidth resource pool.

Aspect 16: The method of any of the preceding aspects, further comprising transmitting a request for a recommended instance for sidelink communication, the recommended instance comprising at least one of: one or more recommended time periods for the UE to communicate using sidelink communication, one or more recommended sub-carriers for the UE to communicate using sidelink communication, or a combination thereof.

Aspect 17: The method of aspect 16, wherein the request for the recommended instance is transmitted based at least in part on a determination that information identifying one or more recommended instances has not been received for a threshold amount of time.

Aspect 18: The method of any of aspects 16-17, wherein transmitting the request for the recommended instance comprises transmitting the request via at least one of sidelink control information (SCI), a medium access control (MAC) control element (CE), or a combination thereof.

Aspect 19: The method any of aspects 16-18, further comprising receiving an indication of the recommended instance from another UE.

Aspect 20: The method of aspect 19, wherein the indication of the recommended instance is received in at least one of a time period or a sub-carrier in which the UE is available according to the FAI.

Aspect 21: The method of any of aspects 16-20, wherein the request for the recommended instance comprises a request for a recommended instance for sidelink communication with one or more specific UEs, and wherein the request includes one or more identifiers corresponding to the one or more specific UEs.

Aspect 22: The method of aspect 21, wherein the recommended instance includes one or more FAIs corresponding to the one or more specific UEs.

Aspect 23: The method of any of aspects 21-22, wherein the recommended instance includes a recommended FAI for the UE based at least in part on the FAI transmitted by the UE.

Aspect 24: The method of any of aspects 16-23, wherein the request for the recommended instance includes a request for a recommended FAI for the UE, wherein the request includes at least one of: an amount of time that the UE is available for an upcoming time period, one or more identifiers corresponding to one or more UEs with which the UE is to communicate, or a combination thereof.

Aspect 25: The method of any of aspects 16-24, further comprising communicating based at least in part on the recommended instance.

Aspect 26: A method of wireless communication performed by a user equipment (UE), comprising: receiving a plurality of future available information (FAI) messages from a plurality of UEs, wherein each FAI message indicates at least one of a time domain availability of a respective UE, of the plurality of UEs, for sidelink communication or a frequency domain availability of the respective UE for sidelink communication; and transmitting, via a sidelink channel, an indication of a set of recommended instances based at least in part on the plurality of FAI messages, wherein the set of recommended instances indicates one or more recommended time periods for sidelink communication, one or more recommended sub-carriers for sidelink communication, or a combination thereof.

Aspect 27: The method of aspect 26, wherein the plurality of FAI messages are included in at least one of a plurality of sidelink control information messages, a plurality of medium access control (MAC) control elements, or a combination thereof.

Aspect 28: The method of any of aspects 26-27, wherein the indication of the set of recommended instances is transmitted in a recommended instance of the set of recommended instances.

Aspect 29: The method of any of aspects 26-28, wherein the indication of the set of recommended instances is transmitted in sidelink control information.

Aspect 30: The method of any of aspects 26-29, wherein the indication of the set of recommended instances is transmitted in a medium access control (MAC) control element (CE) (MAC-CE).

Aspect 31: The method of aspect 30, further comprising transmitting an FAI indicator in sidelink control information, wherein the FAI indicator indicates whether the MAC-CE includes the indication of the set of recommended instances.

Aspect 32: The method of any of aspects 26-31, wherein the indication of the set of recommended instances is transmitted based at least in part on the UE being configured to transmit a physical sidelink broadcast channel (PSBCH).

Aspect 33: The method of aspect 32, wherein the indication of the set of recommended instances or information that identifies a resource for obtaining the indication of the set of recommended instances is transmitted in the PSBCH.

Aspect 34: The method of any of aspects 26-33, wherein the indication of the set of recommended instances is transmitted to another UE based at least in part on receiving a request from the other UE for the set of recommended instances.

Aspect 35: The method of aspect 34, wherein the request includes FAI for the other UE, and wherein the indication of the set of recommended instances is transmitted to the other UE in at least one of an available time period or an available sub-carrier indicated in the FAI for the other UE.

Aspect 36: The method of any of aspects 34-35, wherein the request includes one or more identifiers that identify one or more specific UEs for which the set of recommended instances is requested.

Aspect 37: The method of aspect 36, wherein the indication of the set of recommended instances includes or is based at least in part on one or more FAI messages received from the one or more specific UEs.

Aspect 38: The method of any of aspects 34-37, wherein the indication of the set of recommended instances includes a recommended FAI for the other UE based at least in part on an FAI received from the other UE.

Aspect 39: The method of any of aspects 34-38, wherein the request for the set of recommended instances includes a request for a recommended FAI for the other UE and at least one of an amount of time that the other UE is available for an upcoming time period or one or more identifiers corresponding to one or more UEs with which the other UE is to communicate; and wherein the set of recommended instances is determined based at least in part on the amount of time, the one or more identifiers, or a combination thereof.

Aspect 40: An apparatus for wireless communication at a device, comprising a processor; memory coupled with the processor; and instructions stored in the memory and executable by the processor to cause the apparatus to perform the method of one or more aspects of aspects 1-25.

Aspect 41: A device for wireless communication, comprising a memory and one or more processors coupled to the memory, the memory and the one or more processors configured to perform the method of one or more aspects of aspects 1-25.

Aspect 42: An apparatus for wireless communication, comprising at least one means for performing the method of one or more aspects of aspects 1-25.

Aspect 43: A non-transitory computer-readable medium storing code for wireless communication, the code comprising instructions executable by a processor to perform the method of one or more aspects of aspects 1-25.

Aspect 44: A non-transitory computer-readable medium storing a set of instructions for wireless communication, the set of instructions comprising one or more instructions that, when executed by one or more processors of a device, cause the device to perform the method of one or more aspects of aspects 1-25.

Aspect 45: An apparatus for wireless communication at a device, comprising a processor; memory coupled with the processor; and instructions stored in the memory and executable by the processor to cause the apparatus to perform the method of one or more aspects of aspects 26-39.

Aspect 46: A device for wireless communication, comprising a memory and one or more processors coupled to the memory, the memory and the one or more processors configured to perform the method of one or more aspects of aspects 26-39.

Aspect 47: An apparatus for wireless communication, comprising at least one means for performing the method of one or more aspects of aspects 26-39.

Aspect 48: A non-transitory computer-readable medium storing code for wireless communication, the code comprising instructions executable by a processor to perform the method of one or more aspects of aspects 26-39.

Aspect 49: A non-transitory computer-readable medium storing a set of instructions for wireless communication, the set of instructions comprising one or more instructions that, when executed by one or more processors of a device, cause the device to perform the method of one or more aspects of aspects 26-39.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors, coupled to the memory, configured to:
      determine that an availability condition for transmitting future available information (FAI) is satisfied based at least in part on the UE being unavailable to perform sidelink communication for an amount of time or based at least in part on a capability of the UE to scan an amount of a bandwidth for sidelink communication; and
      transmit the FAI indicating at least one of a time domain availability of the UE for sidelink communication or a frequency domain availability of the UE for sidelink communication based at least in part on determining that the availability condition is satisfied.

2. The UE of claim 1, wherein the FAI comprises committed FAI (CFAI) that indicates at least one of:
   one or more time periods during which the UE will be available for sidelink communication,
   one or more time periods during which the UE will be unavailable for sidelink communication,
   one or more sub-carriers on which the UE will be available for sidelink communication,
   one or more sub-carriers on which the UE will be unavailable for sidelink communication, or
   a combination thereof.

3. The UE of claim 2, wherein the FAI further comprises alternative FAI (AFAI) that indicates at least one of:
   one or more alternative time periods during which the UE will be available for sidelink communication as an alternative to the CFAI,
   one or more alternative time periods during which the UE will be unavailable for sidelink communication as an alternative to the CFAI,
   one or more alternative sub-carriers on which the UE will be available for sidelink communication as an alternative to the CFAI,
   one or more alternative sub-carriers on which the UE will be unavailable for sidelink communication as an alternative to the CFAI, or
   a combination thereof.

4. The UE of claim 1, wherein the one or more processors, when determining that the availability condition is satisfied, are configured to determine that the UE will be unavailable for the amount of time that is greater than or equal to a threshold amount of time in an upcoming time period.

5. The UE of claim 1, wherein the FAI comprises a bitmap, wherein a value of a bit in the bitmap indicates whether the UE is available for sidelink communication during a time period corresponding to the bit, whether the UE is available for sidelink communication on one or more sub-carriers corresponding to the bit, or whether the UE is available for sidelink communication in a combination of a time period and one or more sub-carriers corresponding to the bit.

6. The UE of claim 1, wherein sidelink communication comprises at least one of:
   sidelink reception,
   sidelink transmission, or
   a combination thereof.

7. The UE of claim 1, wherein the one or more processors are further configured to receive an indication of the availability condition.

8. The UE of claim 1, wherein the one or more processors, when transmitting the FAI, are configured to transmit the FAI via sidelink control information (SCI).

9. The UE of claim 1, wherein the one or more processors, when transmitting the FAI, are configured to transmit the FAI in a medium access control (MAC) control element (CE) (MAC-CE).

10. The UE of claim 9, wherein the one or more processors are further configured to transmit an FAI indicator in sidelink control information (SCI), wherein the FAI indicator indicates whether the MAC-CE includes the FAI for the UE.

11. The UE of claim 1, wherein the FAI comprises potential FAI (PFAI) that indicates at least one of:

one or more time periods during which the UE will be available for sidelink communication if requested to be available by another UE,
one or more sub-carriers on which the UE will be available for sidelink communication if requested to be available by another UE, or
a combination thereof.

12. The UE of claim 1, wherein the FAI includes at least one of committed FAI, potential FAI, alternative FAI, or a combination thereof.

13. The UE of claim 1, wherein the FAI is transmitted periodically.

14. The UE of claim 1, wherein the availability condition comprises a bandwidth scanning condition, and wherein the FAI comprises future scanning frequency information (FSFI) that indicates one or more sub-carriers that will be scanned by the UE.

15. The UE of claim 14, wherein the one or more processors, when determining that the availability condition is satisfied, are configured to determine that the UE is capable of scanning the amount of the bandwidth that comprises an amount of a bandwidth resource pool that is less than or equal to a threshold amount of the bandwidth resource pool.

16. The UE of claim 1, wherein the one or more processors are further configured to transmit a request for a recommended instance for sidelink communication, the recommended instance comprising at least one of:
one or more recommended time periods for the UE to communicate using sidelink communication,
one or more recommended sub-carriers for the UE to communicate using sidelink communication, or
a combination thereof.

17. The UE of claim 16, wherein the request for the recommended instance comprises a request for a recommended instance for sidelink communication with one or more specific UEs, and wherein the request includes one or more identifiers corresponding to the one or more specific UEs.

18. The UE of claim 16, wherein the one or more processors are further configured to communicate based at least in part on the recommended instance.

19. A user equipment (UE) for wireless communication, comprising:
a memory; and
one or more processors, coupled to the memory, configured to:
receive a plurality of future available information (FAI) messages from a plurality of UEs, each FAI message indicating at least one of a time domain availability of a respective UE, of the plurality of UEs, for sidelink communication or a frequency domain availability of the respective UE for sidelink communication, and each FAI message being based at least in part on the respective UE being unavailable to perform sidelink communication for an amount of time or based at least in part on a capability of the respective UE to scan an amount of a bandwidth for sidelink communication; and
transmit, via a sidelink channel, an indication of a set of recommended instances based at least in part on the plurality of FAI messages, wherein the set of recommended instances indicates one or more recommended time periods for sidelink communication, one or more recommended sub-carriers for sidelink communication, or a combination thereof.

20. The UE of claim 19, wherein the plurality of FAI messages are included in at least one of a plurality of sidelink control information messages, a plurality of medium access control (MAC) control elements, or a combination thereof.

21. The UE of claim 19, wherein the indication of the set of recommended instances is transmitted in sidelink control information.

22. The UE of claim 19, wherein the indication of the set of recommended instances is transmitted in a medium access control (MAC) control element (CE) (MAC-CE).

23. The UE of claim 22, wherein the one or more processors are further configured to transmit an FAI indicator in sidelink control information, wherein the FAI indicator indicates whether the MAC-CE includes the indication of the set of recommended instances.

24. The UE of claim 19, wherein the indication of the set of recommended instances is transmitted based at least in part on the UE being configured to transmit a physical sidelink broadcast channel (PSBCH).

25. The UE of claim 24, wherein the indication of the set of recommended instances or information that identifies a resource for obtaining the indication of the set of recommended instances is transmitted in the PSBCH.

26. The UE of claim 19, wherein the indication of the set of recommended instances is transmitted to another UE based at least in part on receiving a request from the other UE for the set of recommended instances.

27. The UE of claim 26, wherein the request includes one or more identifiers that identify one or more specific UEs for which the set of recommended instances is requested.

28. The UE of claim 26, wherein the indication of the set of recommended instances includes a recommended FAI for the other UE based at least in part on an FAI received from the other UE.

29. A method of wireless communication performed by a user equipment (UE), comprising:
determining that an availability condition for transmitting future available information (FAI) is satisfied based at least in part on the UE being unavailable to perform sidelink communication for an amount of time or based at least in part on a capability of the UE to scan an amount of a bandwidth for sidelink communication; and
transmitting the FAI indicating at least one of a time domain availability of the UE for sidelink communication or a frequency domain availability of the UE for sidelink communication based at least in part on determining that the availability condition is satisfied.

30. A method of wireless communication performed by a user equipment (UE), comprising:
receiving a plurality of future available information (FAI) messages from a plurality of UEs, each FAI message indicating at least one of a time domain availability of a respective UE, of the plurality of UEs, for sidelink communication or a frequency domain availability of the respective UE for sidelink communication, and each FAI message being based at least in part on the respective UE being unavailable to perform sidelink communication for an amount of time or based at least in part on a capability of the respective UE to scan an amount of a bandwidth for sidelink communication; and
transmitting, via a sidelink channel, an indication of a set of recommended instances based at least in part on the plurality of FAI messages, wherein the set of recommended instances indicates one or more recommended time periods for sidelink communication, one or more recommended sub-carriers for sidelink communication, or a combination thereof.

\* \* \* \* \*